(12) United States Patent
Watson

(10) Patent No.: US 9,645,575 B2
(45) Date of Patent: May 9, 2017

(54) METHOD AND APPARATUS FOR ARTIFICIALLY INTELLIGENT MODEL-BASED CONTROL OF DYNAMIC PROCESSES USING PROBABILISTIC AGENTS

(71) Applicant: ADEPT AI SYSTEMS INC., Acheson (CA)

(72) Inventor: Jeff Watson, Edmonton (CA)

(73) Assignee: ADEPT AI SYSTEMS INC., Acheson (CA)

( * ) Notice: Subject to any disclaimer, the term of this patent is extended or adjusted under 35 U.S.C. 154(b) by 534 days.

(21) Appl. No.: 14/092,803

(22) Filed: Nov. 27, 2013

(65) Prior Publication Data

US 2015/0148919 A1 May 28, 2015

(51) Int. Cl.
G05B 13/04 (2006.01)
G05B 23/02 (2006.01)
G06N 7/00 (2006.01)

(52) U.S. Cl.
CPC ......... *G05B 23/0297* (2013.01); *G06N 7/005* (2013.01)

(58) Field of Classification Search
CPC .............................. G05B 23/0297; G06N 7/005
See application file for complete search history.

(56) References Cited

U.S. PATENT DOCUMENTS

| | | |
|---|---|---|
| 5,566,092 A | 10/1996 | Wang et al. |
| 6,381,505 B1 | 4/2002 | Kassmann et al. |
| 6,460,049 B1 | 10/2002 | Becker et al. |
| 6,532,454 B1 | 3/2003 | Werbos |
| 6,655,922 B1 | 12/2003 | Flek |
| 6,714,899 B2 | 3/2004 | Kassmann |
| 6,732,052 B2 | 5/2004 | MacDonald et al. |
| 6,959,224 B2 | 10/2005 | Good et al. |
| 6,980,929 B2 | 12/2005 | Aronstam et al. |
| 7,117,108 B2 | 10/2006 | Rapp et al. |
| 7,299,215 B2 | 11/2007 | Drescher et al. |
| 7,379,993 B2 | 5/2008 | Valdes et al. |
| 7,720,779 B1 | 5/2010 | Perry et al. |
| 7,797,062 B2 * | 9/2010 | Discenzo ............. G05B 13/024 700/19 |
| 7,818,276 B2 | 10/2010 | Veillette et al. |
| 7,949,483 B2 | 5/2011 | Discenzo et al. |
| 8,037,012 B1 | 10/2011 | Svinos et al. |
| 8,380,642 B2 | 2/2013 | Stundner et al. |

(Continued)

FOREIGN PATENT DOCUMENTS

GB 2403034 A 12/2004

OTHER PUBLICATIONS

PCT International Search Report and Written Opinion for corresponding PCT Application No. PCT/CA2014/051139.

(Continued)

*Primary Examiner* — Carlos Ortiz Rodriguez
(74) *Attorney, Agent, or Firm* — Parlee McLaws LLP (CGY); Sean Goodwin

(57) ABSTRACT

A system and method for controlling a process such as an oil production process is disclosed. The system comprises multiple intelligent agents for processing data received from a plurality sensors deployed in a job site of an oil well, and applies a probabilistic model for evaluating risk and recommending appropriate control action to the process.

27 Claims, 26 Drawing Sheets

(56) References Cited

U.S. PATENT DOCUMENTS

| | | | |
|---|---|---|---|
| 8,392,418 B2 | 3/2013 | Birdwell et al. | |
| 8,589,078 B2 | 11/2013 | Djikpesse et al. | |
| 2005/0273296 A1 | 12/2005 | Zhu et al. | |
| 2010/0228398 A1 | 9/2010 | Powers et al. | |
| 2012/0025997 A1 | 2/2012 | Liu et al. | |
| 2012/0304007 A1 | 11/2012 | Hanks et al. | |
| 2013/0173505 A1 | 7/2013 | Balogun et al. | |

OTHER PUBLICATIONS

Abdullah S. Al-Yami et al., "The Use of Artificial Bayesian Intelligence in Practical Well Control," published in SPE 160662-MS, 2012.

Turuna S. Seecharan et al., "Probability-Based Design Optimization of Dynamic Systems," published in International Journal of Reliability, Quality and Safety Engineering, vol. 19, No. 1 (2012) 1250001, pp. 1-20.

S. Liu et al., "Automatic Early Fault Detection for Rod Pump Systems," published in SPE 146038-MS, 2011.

Biao Huang, "Bayesian methods for control loop monitoring and diagnosis," published in the Journal of Process Control 18 (2008), pp. 829-838.

Gaya Buddhinath Jayatilleke et al., "A model driven component-based development framework for agents," published in the International Journal of Computer Systems Science & Engineering, vol. 20, No. 4, (Jul. 2005), pp. 273-282.

Ioannis N. Athanasiadis et al., "An agent-based intelligent environmental monitoring system," published in the Management of Environmental Quality: An International Journal, vol. 15, No. 3 (2004), pp. 238-249.

Biao Huang et al., "Model predictive control relevant identification and validation," published in the Chemical Engineering Science 58 (2003), pp. 2389-2401.

Biao Huang, "Multivariable model validation in the presence of time-variant disturbance dynamics," published in the Chemical Engineering Science 55 (2000), pp. 4583-4595.

J.F. Lea et al., "Interpretation of Calculated Forces on Sucker Rods," published in SPE 25416, SPE Production & Facilities, Feb. 1995, pp. 41-45.

Barbara Hayes-Roth et al.,"A Satisficing Cycle for Real-Time Reasoning in Intelligent Agents," research paper, Expert Systems with Applications, 1993, Knowledge Systems Laboratory.

Eugene Charniak, "Bayesian Networks without Tears," AI Magazine, Winter 1991, pp. 50-63.

J.F. Keating et al., "Application of a Pattern-Matching Expert System to Sucker-Rod, Dynamometer-Card Pattern Recognition," published in SPE 21666, 1991, pp. 323-333.

J.E. Chacin U. et al., "New Model for Studying Oilwell Pumping Installations," published in SPE 16918, 1987, pp. 395-404.

\* cited by examiner

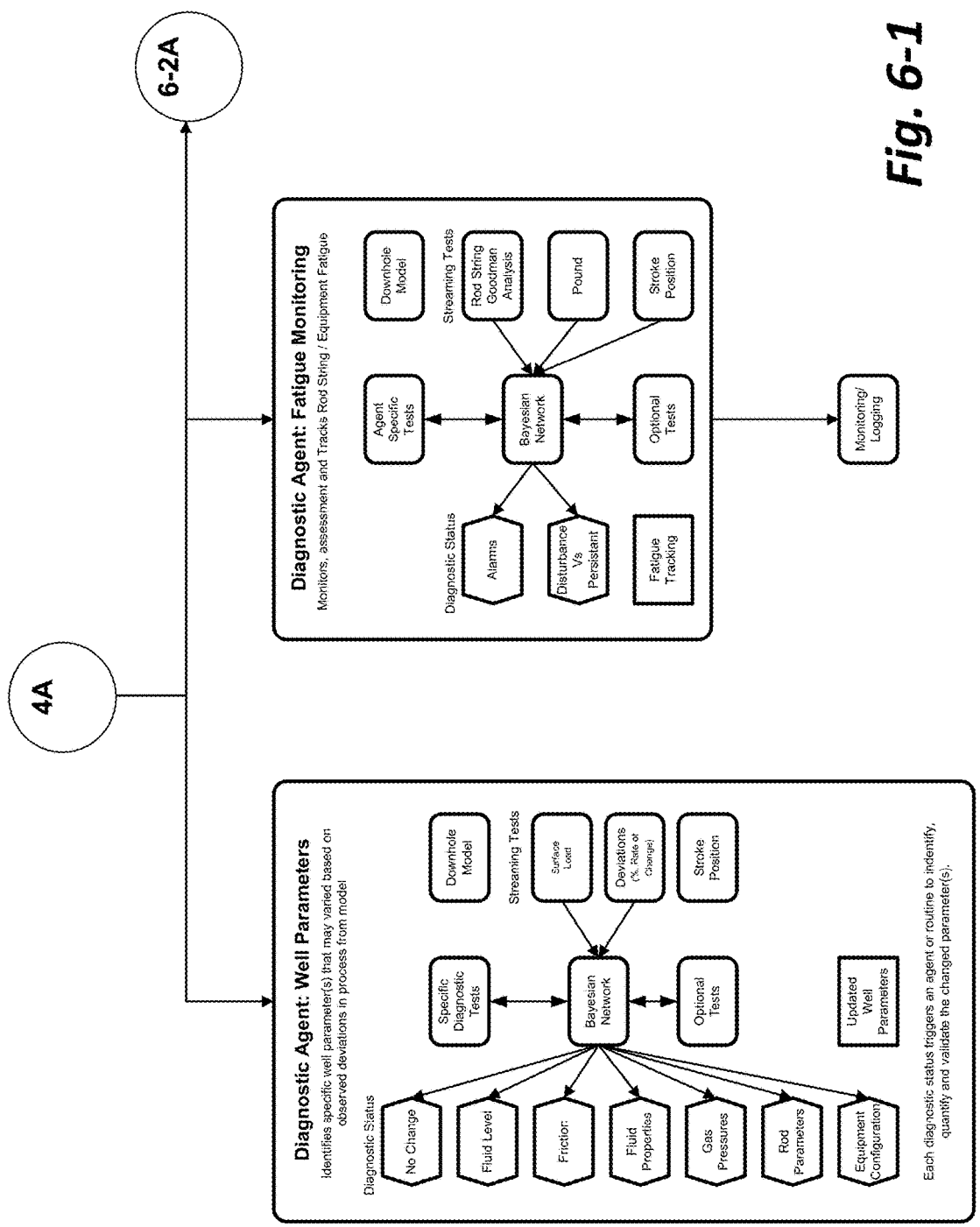

Fig. 8

METHOD AND APPARATUS FOR ARTIFICIALLY INTELLIGENT MODEL-BASED CONTROL OF DYNAMIC PROCESSES USING PROBABILISTIC AGENTS

FIELD

Embodiments taught herein relate generally to methods and apparatus for controlling complex equipment and dynamic processes and, more particularly, to methods and apparatus for controlling said equipment and processes with greater certainty for decision making during the controlling hereof.

BACKGROUND

Complex industrial equipment is often critical to production operations with significant upstream and downstream effects in the event of performance losses or equipment failure. Sensor and equipment failures, sensor calibration drift, varying process parameters and changes or disturbances in operating conditions or environment can all contribute to production problems and losses.

The fusion of sensors, equipment and dynamic processes, some of which cannot be measured cost effectively or at all, make it very difficult for production operations to identify, let alone remediate equipment and production problems. As a consequence, many companies require skilled operators or contractors to observe and identify problems and determine which actions or solutions to implement. Often sufficient information is not available on a timely basis, however decisions are still required.

Traditionally advanced control systems use defined models of processes to correct for process variations or disturbances. It can often be difficult, or not possible at all, to accurately determine, anticipate or identify the causality of variations or disturbances. Determining the best possible course of action under these circumstances is even more difficult especially when control action based on incorrect diagnosis can place the process or the product at risk.

As taught by Ken Schwaber and Mike Beedle in *Agile Software Development with Scrum*, (2002) Upper Saddle River: Prentice Hall, p. 25, ISBN 0-13-067634-9, retrieved Jul. 6, 2007:

"The defined process control model requires that every piece of work be completely understood. Given a well-defined set of inputs, the same outputs are generated every time. A defined process can be started and allowed to run until completion, with the same results every time." http://en.wikipedia.org/wiki/Defined process—cite note-1

Model predictive control techniques typically require the nature of disturbances to be known in advance in order to provide control direction to bring the process back within its normal operating envelope. Such techniques also require the parameters of the model to be accurately tuned such that inputs to the model generate accurate and relevant outputs. Such applications require significant upkeep by highly skilled and knowledgeable individuals unless they are highly stable.

Such advanced control techniques are typically addressed with an exhaustive set of logical or knowledge based rules to try and identify with certainty what the cause is and the best course of action to implement. Multiple contributions to an observable problem can create sufficient uncertainty that these systems cannot perform or there are simply too many variations to exhaustively catalog. In addition, the computational requirements to diagnose and determine appropriate corrective action can interfere with the performance of time sensitive process monitoring and control.

Addressing these issues requires a hardware and software platform capable of identifying and prioritizing real time control actions while executing advanced Artificial Intelligence (AI) methods that enable diagnostics and decision making in uncertain conditions.

Pattern recognition is a common feature in artificial intelligence and machine learning applications. In general it is used to assign a label or classification to a given input value by performing "most likely" matching of the inputs, taking into account their statistical variation. It is often confused with pattern matching which looks for exact matches in the data input with pre-existing pattern(s) such as is taught in U.S. Pat. No. 7,818,276 Veillette.

Pattern recognition is a technique typically devoid of a true understanding of the physical data. Relying solely on pattern recognition to classify a variation or a disturbance to a process for the basis of a control action is akin to taking a blind risk.

There is a need for apparatus and methods for controlling dynamic processes such that sufficient confidence and certainty in the process state exists so that automated control action can be taken with acceptable levels of risk.

BRIEF DESCRIPTION OF THE DRAWINGS

FIG. 8 is a diagrammatic representation of a grouping of a variety of nodes that could be used to represent values in the process, model and metrics according to the pump embodiment of FIG. 1;

SUMMARY

Figure 1:
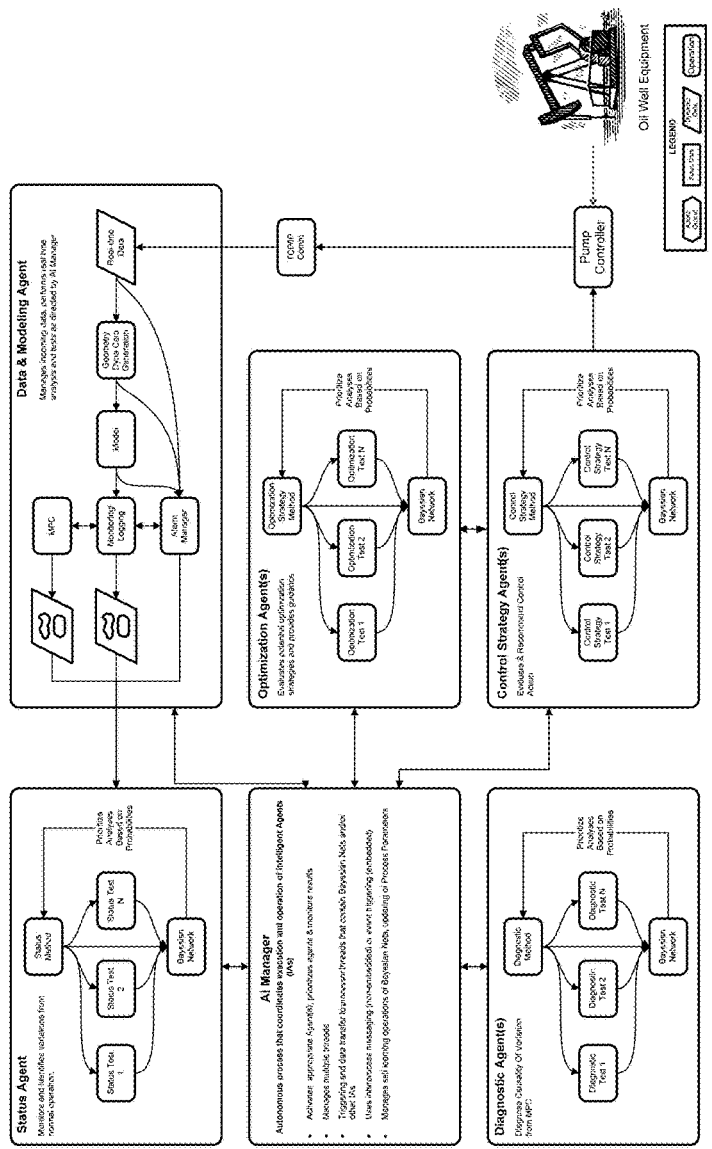
FIG. 1 is a flowchart illustrating an embodiment of a hierarchical structure of an Intelligent Agent (IA) network having several types of intelligent agents for control and optimization of an apparatus and process, in the context of a sucker rod pump controller for oil wells.
Figure 1:
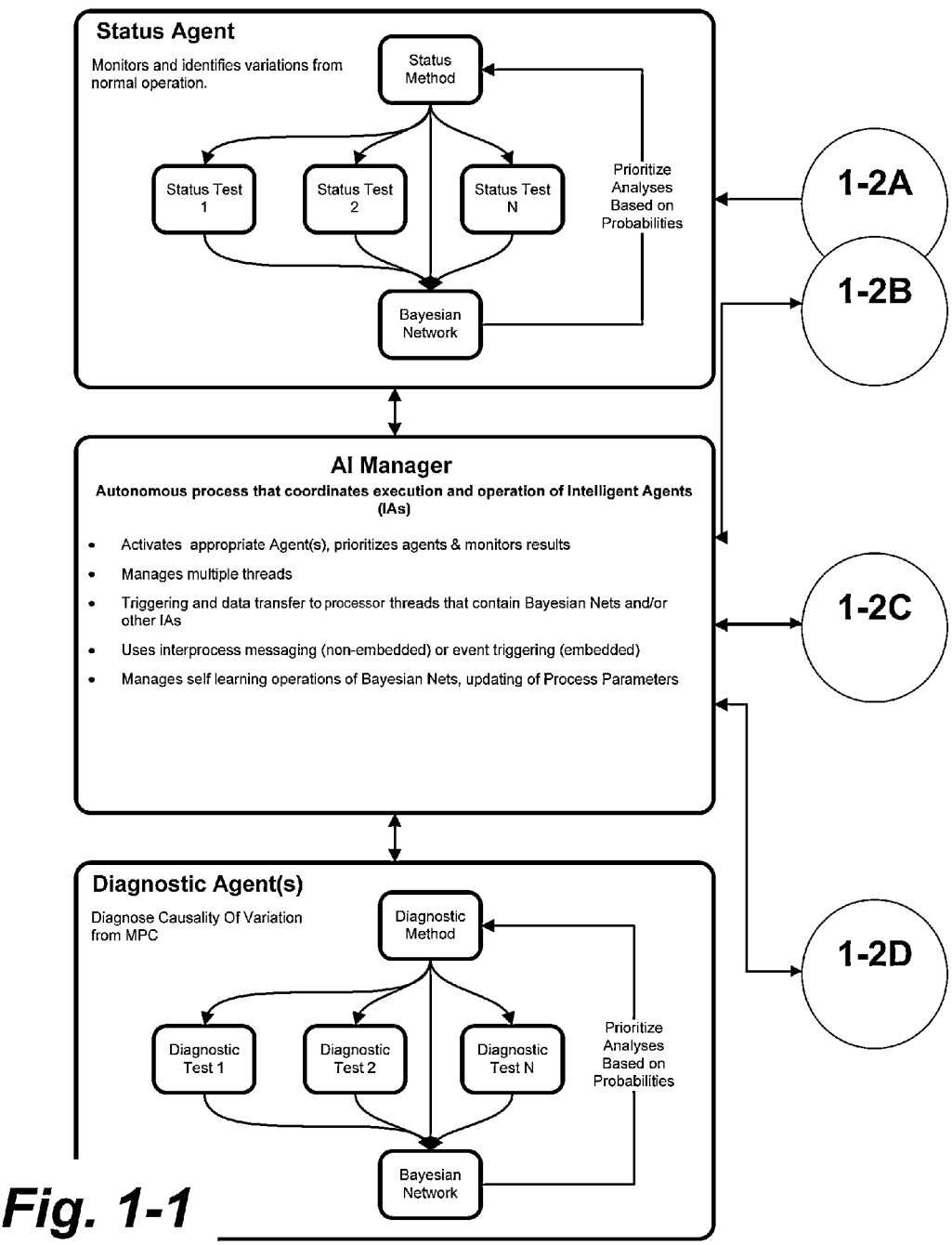

There is provided an artificially intelligent model-based controller (AIMC) that undertakes an analytic validation of the results of a classification by an intelligent agent and to combine that with other observations of process variables to establish, as deterministically, as possible the diagnosis of the process state and its underlying causes such that sufficient confidence in the process state exists so that automated control action can be taken with acceptable levels of risk.

In one aspect of the invention a system is provided controlling a process in response to data collected from a plurality of sensors, said system comprising: a status agent for monitoring the status of the system based on data collected from the sensors; at least one diagnostic agent for diagnosing at least a portion of the system and collecting diagnostic data from the sensors to identify deviation from normal operation; a control agent for performing control actions to the process; and a supervisory manager coupling to the status agent, the at least one diagnostic agent and the control agent. The supervisory manager receives real time process data generated from the process; compares against a predictive objective function and/or a historical mean and/or a predicted operational envelope and/or a predetermined static function for establishing any deviation from normal operation; applies probabilistic modeling at the status agent for classifying the source and likely cause of the deviation; prioritizes actuation of the at least one diagnostic agent related to causality of the deviation; modifies the probabilistic model of the status agent from the results from the at least one diagnostic agent; and applies a probabilistic model at a control agent for evaluating risk and recommending appropriate control action to the process.

In another aspect of the invention, a method for controlling a process comprises: receiving real time process data generated from the process; comparing against a predictive objective function and/or a historical mean and/or a predicted operational envelope and/or a predetermined static function for establishing any deviation from normal operation; applying probabilistic modeling at a status agent for classifying the source and likely cause of the deviation; prioritizing actuation of at least one or more diagnostic agents related to causality of the deviation at a supervisory manager; communicating the results of the diagnostic agents to the supervisory manager; modifying the probabilistic model of the status agent from the results from the one or more diagnostic agents; and applying a probabilistic model at a control agent for evaluating risk and recommending and initiating an appropriate control action to the process.

DETAILED DESCRIPTION OF THE PREFERRED EMBODIMENTS

Embodiments taught herein utilize an artificially intelligent model-based controller (AIMC) to undertake an analytic validation of the results of a classification by an intelligent agent and combine that with other observations of process variables to establish as deterministically as possible the diagnosis of the process state and its underlying causes such that sufficient confidence in the process state exists so automated control action can be taken with acceptable levels of risk.

A collection of probabilistic methods and pattern recognition techniques are utilized to provide a hybrid monitoring and control system that incorporates stochastic understanding of the process with machine learning techniques to make process control decisions under uncertainty as deterministically as possible.

Embodiments of the system have incorporated Probabilistic Graphical Networks (PGN), such as Bayesian networks, and time series pattern recognition techniques and the like, to structure and evaluate the classification and diagnosis of the current state of the process by utilizing process variables, states and the outcomes of tests including relevant analytical models of processes, process sub systems or disturbances to validate the likelihood of the various classifications.

Applicant believes that the process model(s) should be accurately tuned to reflect current operating conditions for the embodiments described herein to perform optimally. Thus, a similar methodology is applied to the process model where normal process operation is observed and compared to past observations to detect drift of process parameters. Process simulations or a statistical representation of process outputs resulting from process parameter drifts are compared against current observations and used to identify, validate and update changes to the process model(s).

Additionally, a process simulation can be utilized to map exhaustively, or selectively, the process response to process variables, their range of operation and potential deviations such that changes to a process can be determined probabilistically and represented as a PGN, potentially via machine learning techniques. When combined with historical observations of the process, parameter tuning or process optimization is enabled that is highly deterministic in nature without exhaustive simulations and/or numerical methods in real time.

Using machine learning techniques, process responses such as energy consumption or production output could be represented in a PGN and used to provide guidance to a numerical optimization means. The guidance could encompass identifying a compact range for the numerical search to converge on an optimal solution for the operating parameters or in the event of a process with high levels of certainty, provide the optimal operating parameters directly to control. In an alternate embodiment, the process variables could be represented as Fourier series or other approximation means and a probabilistic mapping of the global responses of the process could be generated as a function of these Fourier coefficients. This provides a unique advantage over other optimization methods as it can greatly reduce the time required to determine a local or a global optimum for the process in real time.

The probabilistic mapping of the process could be computed in the background of a processor controlling the process or on a separate processor which could also utilize parallel computing methods to reduce the elapsed time, and generate the probability tables for the optimization PGN.

Furthermore, the determination of a control action is based on a decision analysis that incorporates the cost and risk associated with the possible decision choices including the risk of taking control action on an incorrect classification or observation.

At the core of the AIMC system is a network of Intelligent Agents (IAs) each performing a predetermined scope of analysis and managed by a central AI Manager.

Embodiments described herein will be described generally and in the context of a sucker rod pump controller for oil wells for controlling and optimizing the operation thereof. Those of skill in the art will understand that AIMC systems, based upon the embodiments taught herein, are in no way limited only for controlling a sucker rod pump, but can be customized for use in any number of different types of dynamic processes in a wide variety of industries.

Having reference to FIG. 1, an embodiment of a hierarchical structure of an IA network is shown having several types of agents in the context of control and optimization of a sucker rod pump controller for oil wells.

One aspect of the AIMC system is the integration of single or multiple process models and model predictive control techniques in conjunction with multiple Intelligent Agents or agents (IAs). Each IA performs, directs and prioritizes specialized analysis, diagnosis and control direction utilizing probabilistic reasoning methods such as probabilistic graphical models or Bayesian Networks. The AI Manager initiates and prioritizes the various IAs to optimize processor utilization, communicates the results of tests, diagnoses and control recommendations and facilitates the learning capability via updates to the data and probability tables used by the PGNs or Bayesian Networks utilized by the various IAs.

Multiple applications of the system can be made to work collaboratively, such as in the case of an oil field, where each well would have an AIMC system which also shares knowledge and learning with other wells and with higher level systems such as an intelligent field manager or Supervisory Control and Data Acquisition (SCADA) system. Even wells no on the same pad can benefit as the sell data, pump dynacards and patterns can be normalized. The knowledge can be shared by updating the probability tables within the PGNs; using the case histories of other wells to train the PGNs at other wells using other machine learning techniques, or through sharing of learned process parameters or patterns observed in process data. The SCADA may also provide control direction based on the data and knowledge the SCADA receives collectively from the individual wells.

As previously noted, while the current implementation has been initially applied to a sucker rod pump system and field of oil wells, it is recognized that the technology could be applied to other processes where a process model can be utilized to ensure the optimal operation of the system from a production, maintenance and economic viewpoint.

As computation capacity and programmability of most industrial controllers is typically too limited to implement modern AI techniques, a control platform incorporates a run-to-completion, event driven operating system with a non-blocking kernel that can prioritize the monitoring and control of time sensitive aspects of the control solution while running multiple algorithms or threads incorporating artificial intelligence methods that may run synchronously or asynchronously with a given process on a priority basis.

Embodiments implement a controller that is scalable such that computation can be distributed to addition processors, whether local or remote on embedded or PC computation platforms.

Such as controller can further connect to existing or proprietary controller networks to access and monitor process data and perform diagnostic and optimization tasks. This enables the technology described herein to be integrated into existing or custom engineered systems and OEM products. Alternatively the AIMC system can incorporate digital or analog inputs (I/O) of its own in addition to accessing existing controllers or remote I/O modules. In one implementation, control direction is provided to industrial controllers that provide monitoring of I/O and provide the basic control operation with independent safety interlocks and permissives that are typical of that process.

The resulting technology enables diagnostic methods similar to that of automated medical diagnostic tools. While equipment is operating, the IAs run in the background identifying equipment and process issues, performing tests and calculations to identify with acceptable certainty the operational state of the system being monitored, the source(s) of any deviations from normal operation or problems, the best course of action and implement the action and/or provide operational guidance to operators, supervisors or other automated controllers.

The artificially intelligent model-based controller (AIMC) utilizes one or more of a process model, historical process information and/or process-derived state machines to monitor a process. The AIMC further uses a collection of intelligent agents to identify process deviations and disturbances, classify, determine and validate the nature or underlying causality for the disturbances utilizing PGN such as Bayesian Networks that operate synchronously or asynchronously. The AIMC initiates optimization routines and determines control direction utilizing risk assessment and decision analysis with PGN or Bayesian Networks. Operations of the AIMC are coordinated via a central AI Manager that initiates and prioritizes the various agents.

Overview of Intelligent Agents (IAs)

Embodiments taught herein utilize a variety of IAs, including but not limited to, the AI Manager, the SCADA Manager, Data and Modeling Agents, Status Agents, Diagnostic Agents, Model Tuning Agents, Optimization Agents and Control Strategy Agents.

The basic structure of an IA is a statistical or probabilistic causality model with supporting algorithms and software methods to enable updates of the IA's probability tables, entry of states for node values in a Probabilistic Graphical Model (PGM) and execution of queries. These agents IA may include additional algorithms and methods such as such pattern recognition, numerical methods to estimate process parameters or optimize process operation as well as those to monitor, test and classify observations. In an embodiment, the AIMC contains a causality model which is a Probabilistic Graphical Model (PGM) in the form of a Bayesian Net or undirected probabilistic network such as a Markov net, however there are other implementations of PGNs that could be used to perform these functions and are known to those skilled in the art.

A typical operation of an intelligent agent includes the following:
- receiving incoming data;
- if required use algorithms to further analyze the data;
- update any probability tables;
- calculate or solve statistical or probabilistic causality model;
- determine whether a decision or direction has been reached;
- if not, identify additional tests or data required;
- report to AI Manager; and
- wait for further instructions or data from AI Manager until a resolution has been reached.

Depending on the process and the different diagnostic complexities, multiple IAs of each type of IA may be deployed. The activation and execution of the IAs are controlled on a priority basis that is statistically or probabilistically determined. Alternately, IAs may be broken into separate or sub-agents to reduce their complexity and/or enhance their capabilities. For example, a data and modeling agent may be split into a separate IA for managing and testing historical data and a separate IA for managing and testing real-time or streaming data. A Diagnostic Agent and its PGN may constructed in an object-oriented manner wherein it comprised multiple sub-PGNs, each for a range of potential diagnoses, that can be run individually as separate agents or as part of a larger more encompassing PGN in a single agent. One example of multiple sub-agents under an encompassing agent is an object-oriented Bayesian Network (OOBN). A PGN may be represented as a single node in a larger PGN network. The PGN can be run on its own or in conjunction with others.

Implementation

Figures 1, 2:
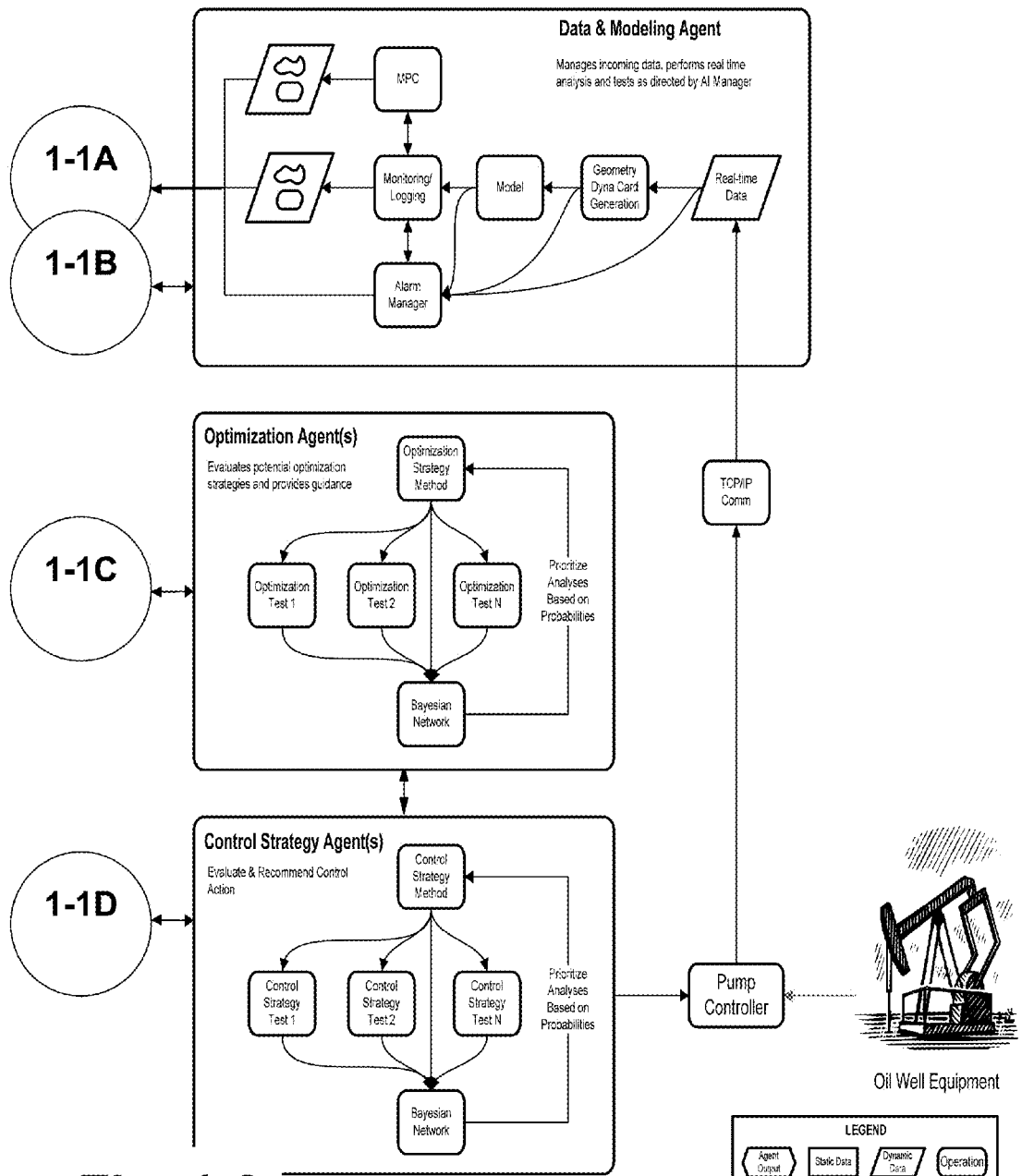
FIG. 2 is a functional diagram of a Status Agent illustrating the interaction of a Status Agent (of FIG. 2-2) with the Data and Modelling Agent, Diagnostic Agents (FIG. 2-1) and a Parameter Tuning Agent (FIG. 2-2), in an embodiment according to FIG. 1.
Figure 2:
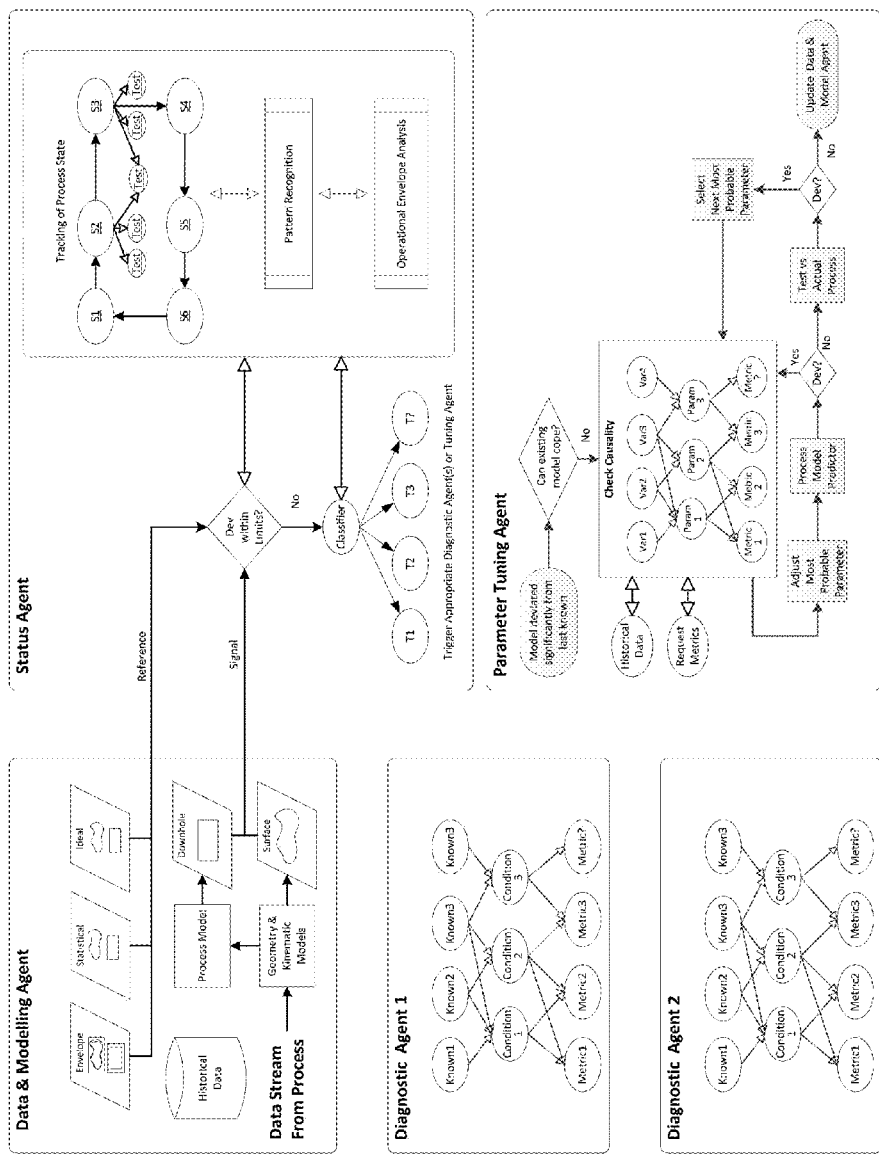
Figures 1, 2:
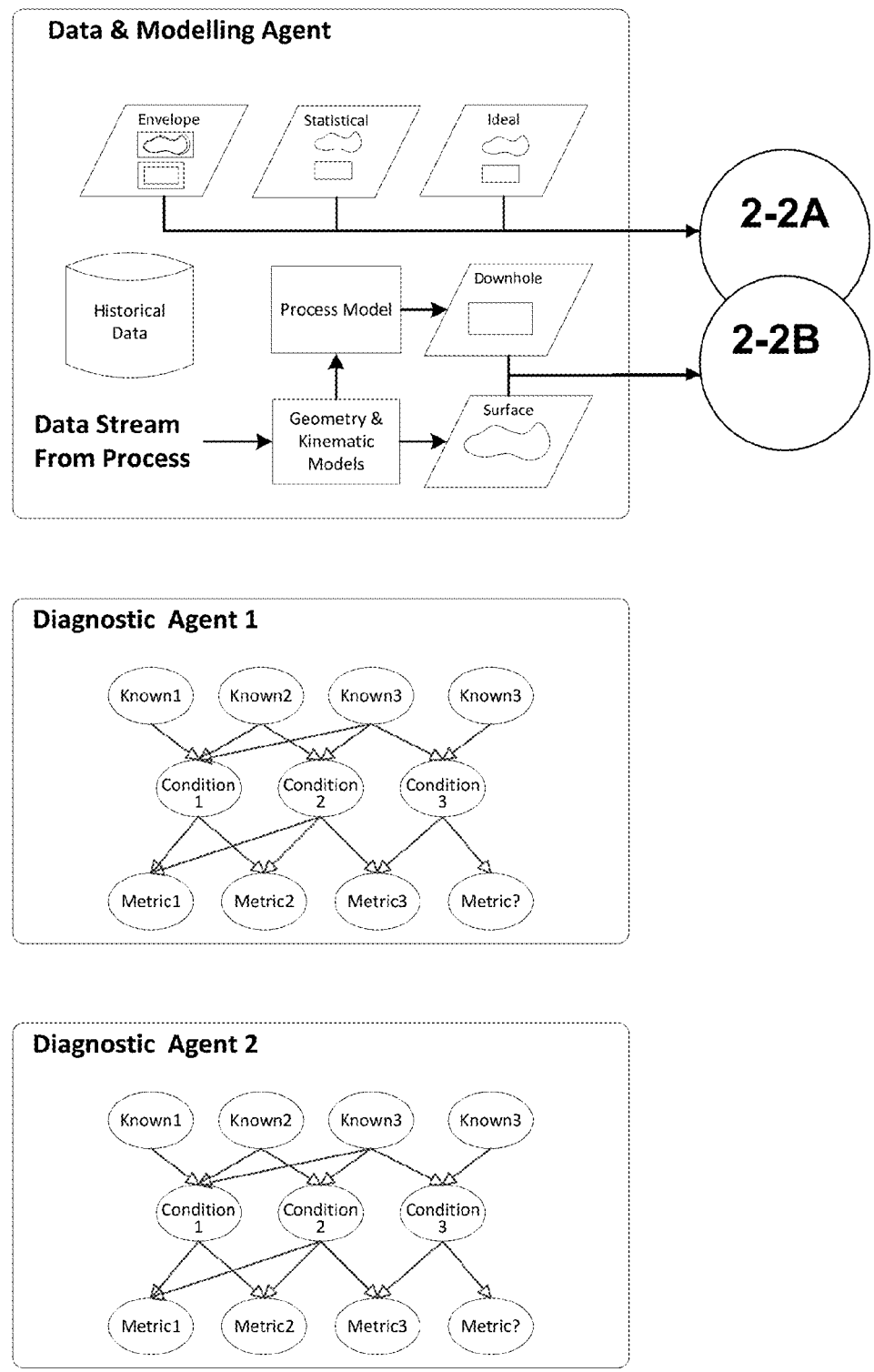
Figure 2:
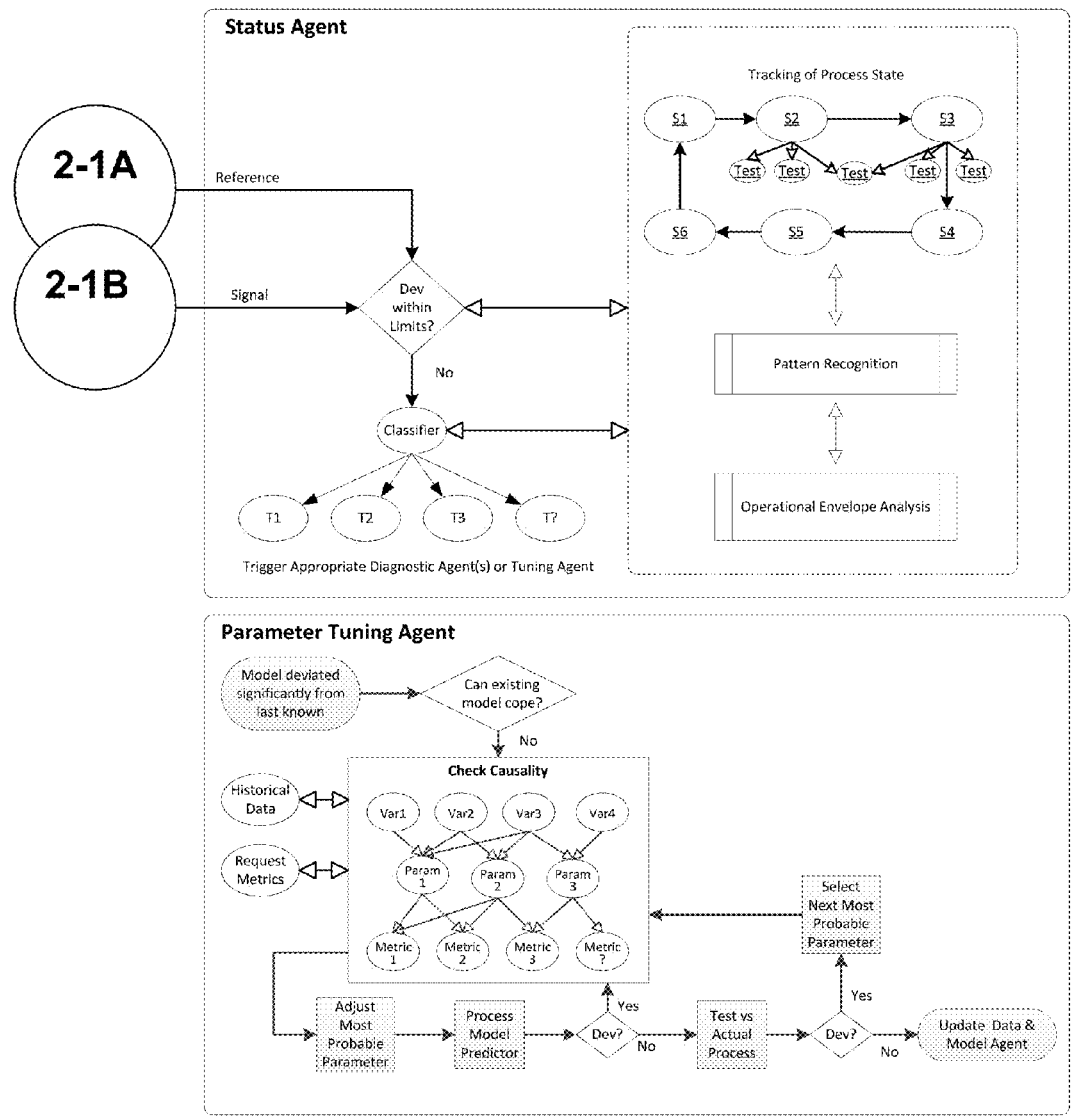
Figure 3:
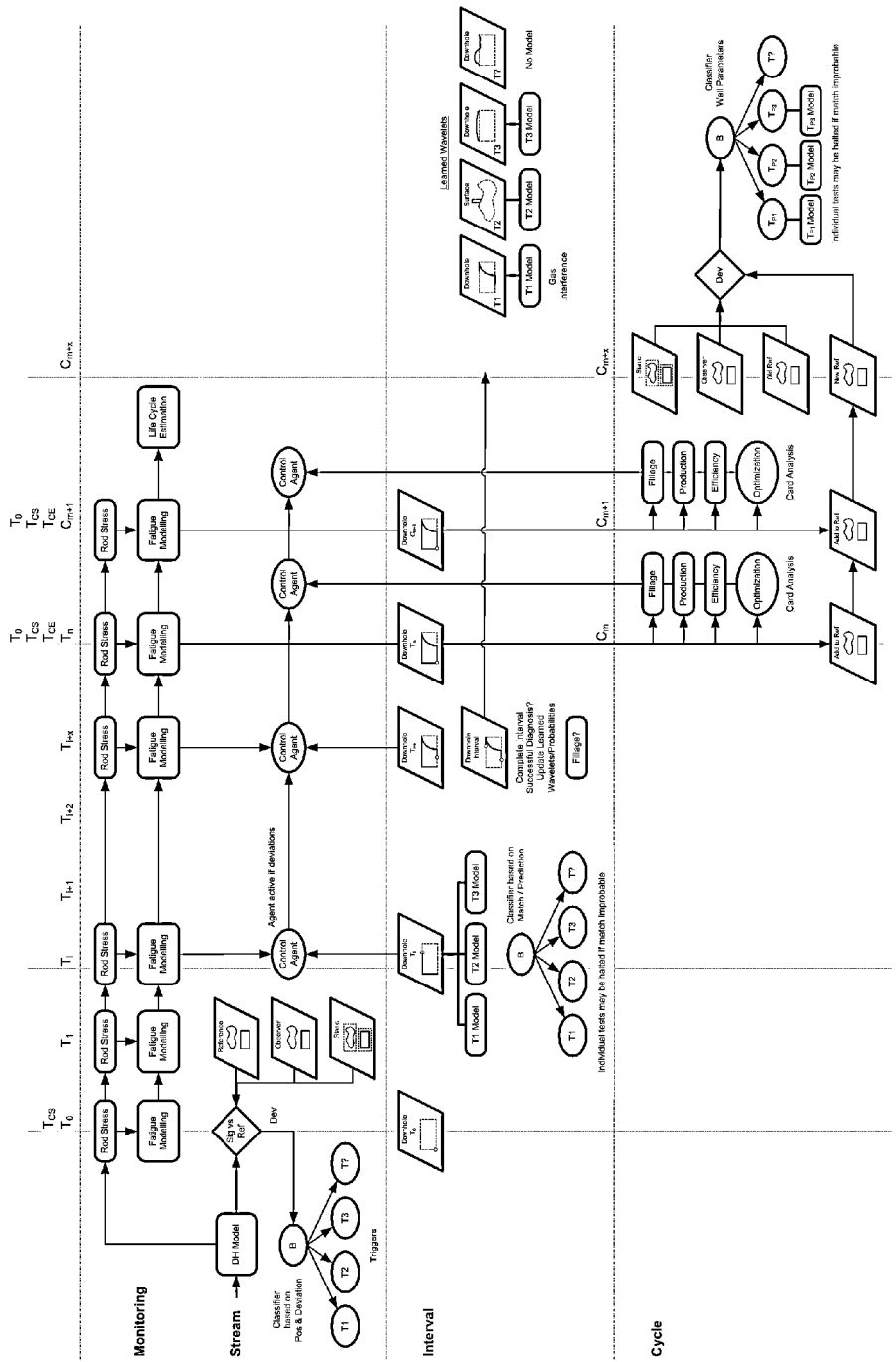
FIG. 3 is a timing diagram for an implementation with a cyclic pumping process wherein the supervisory agent is monitoring the streamed data from the process at time increments (FIG. 3-1) intermediate a cycle and performing testing, probabilistic classification for recruiting appropriate Control Agents as necessary, learning and updating agents (FIG. 3-2) and further monitoring the cycle as a whole (FIGS. 3-2 and 3-3) classifying the results on a probabilistic basis to intelligently control the cycle and manage deviations.
Figures 1, 3:
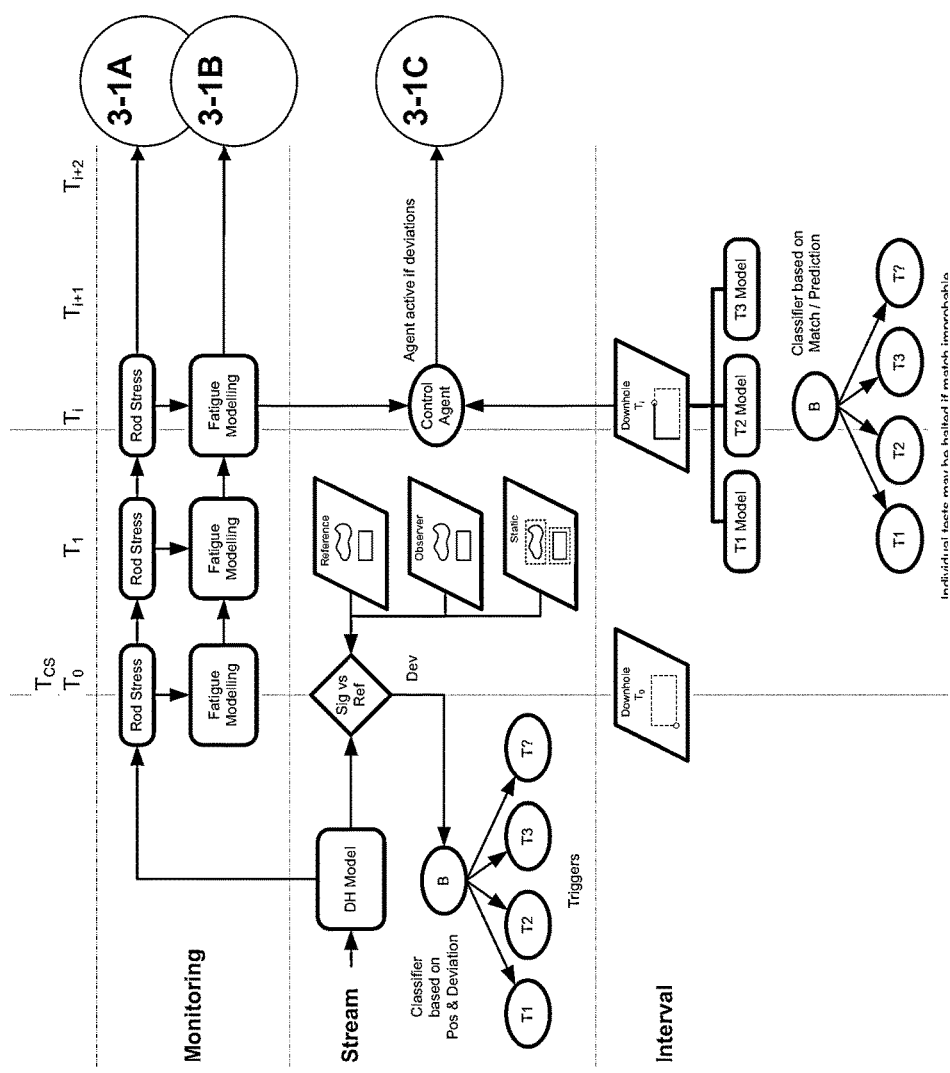
Figures 2, 3:
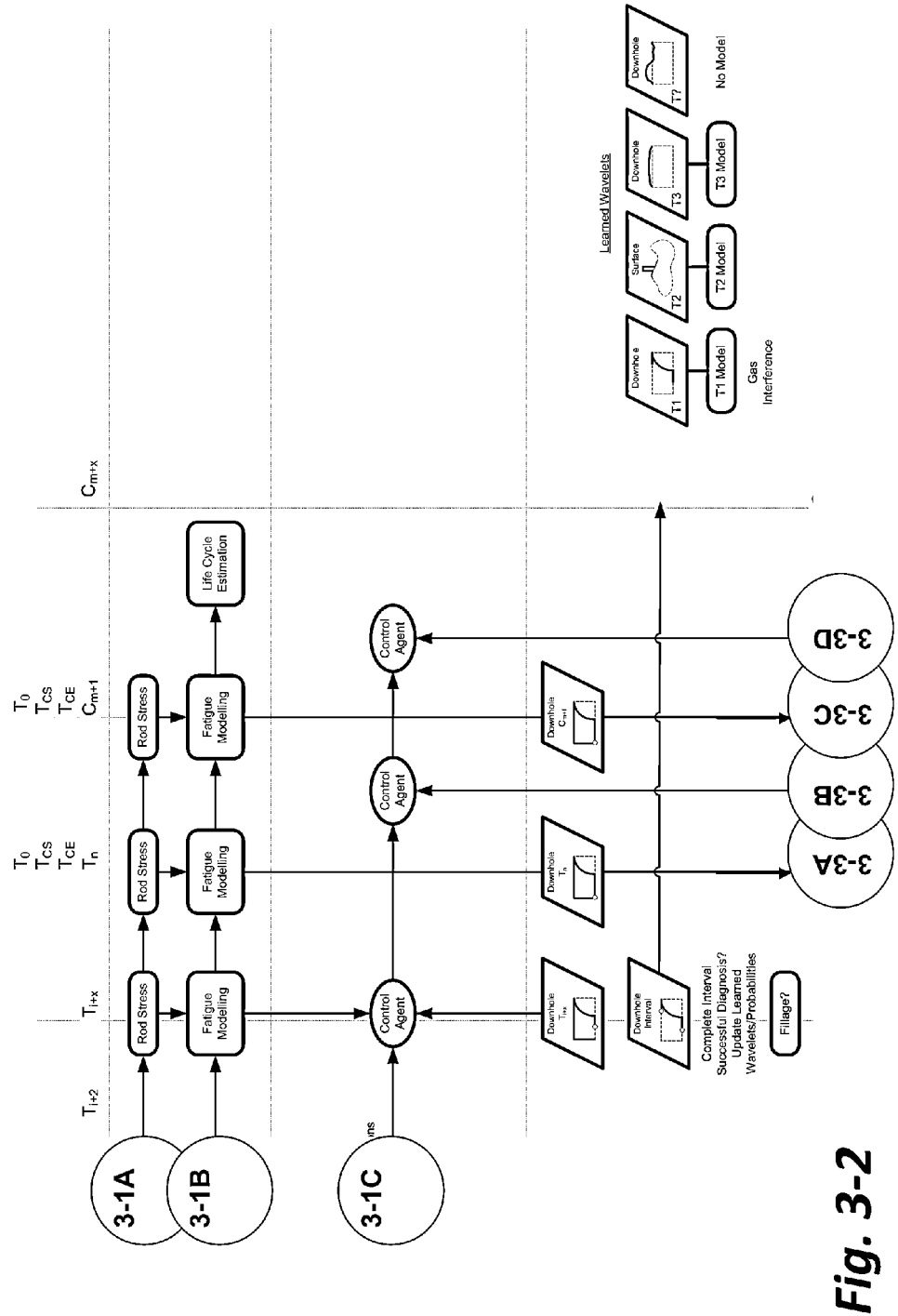
Figure 3:
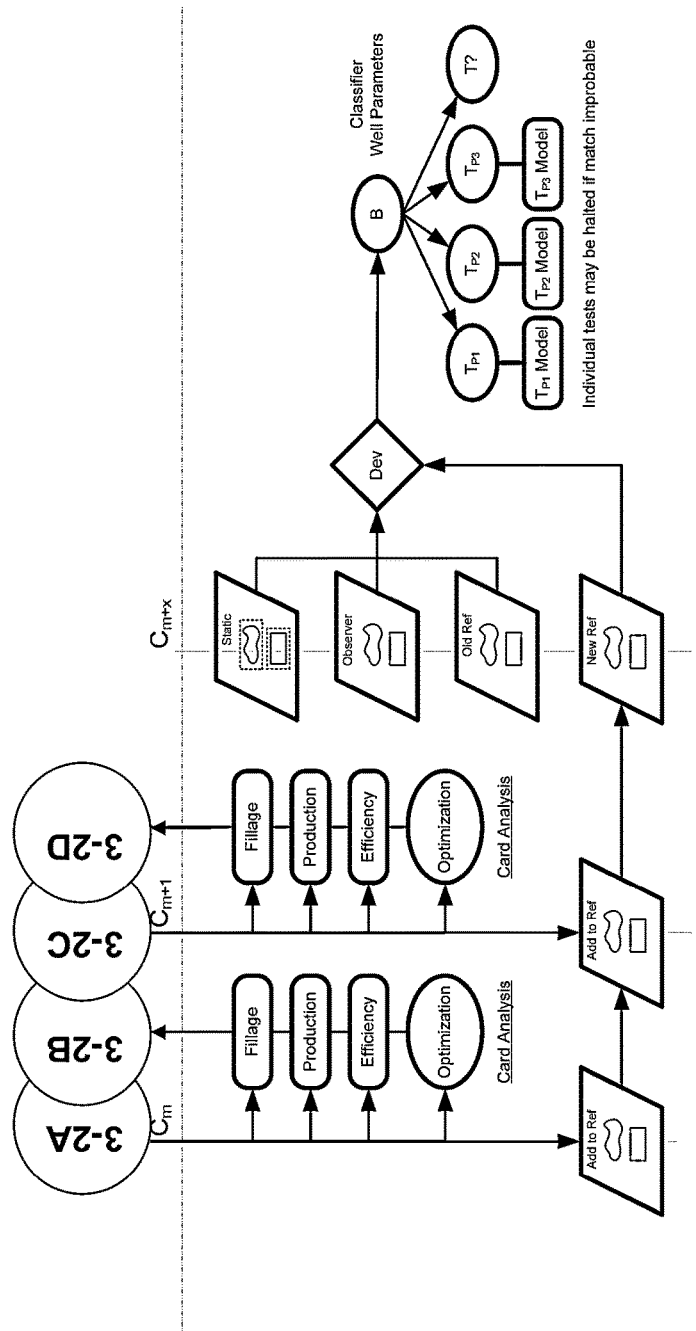

Having reference to FIG. 2, a functional diagram of a Status Agent illustrates the interaction of the Status Agent with a Diagnostic Agent and a Parameter Tuning Agent. Further, FIG. 3 illustrates a timing diagram for the embodiment of FIG. 1, being set forth in the context of a cyclic pumping process.

A functional diagram of the Status Agent showing its interaction with the Diagnostic and Parameter Tuning Agents is shown in FIG. 2. A timing diagram for the implementation with a cyclic pumping process is shown in FIG. 3.

In summary, general application of the roles of the agents is similar to that set forth in the context of an oil well pumpjack.

The system comprises comparing real time data to statistical and/or historical profiles of the process or a simulated profile of the process, taking into account operational variance and thereby identifying deviations. The Status Agent tracks the progress and the specific states of the process. Pattern recognition, drift from the operational envelope, and metrics of the deviation are in a classifier to identify probable diagnostic agents to trigger including a parameter tuning agent. The AI Manager triggers the appropriate diagnostic agents and receives the results. Diagnostic Agents with causal process-specific PGNs identify probable causes for the deviation and their likelihood.

The AI Manager compares the probabilities of the various Diagnostic Agents and updates the Status Agent of the diagnosis of high certainty or initiates additional tests if the level of uncertainty is too high to differentiate a likely cause. The AI Manager may further initiate the Model Tuning agent based on the output of the diagnostic agents. Control strategy agents assess opportunity and/or risk of control action based on the probability of one or more diagnoses and recommends a control action based on the opportunity/risk analysis. Further, Optimization agents may be triggered prior to a control action being implemented to optimize or determine the precise control action to be taken.

Detailed Agent Description

As previously noted, the IAs are described herein in the context of the sucker rod pump application. Other contexts are discussed later for illustrating variations in the context-specific behaviour of the specified agents.

AI Manager

Figure 4:
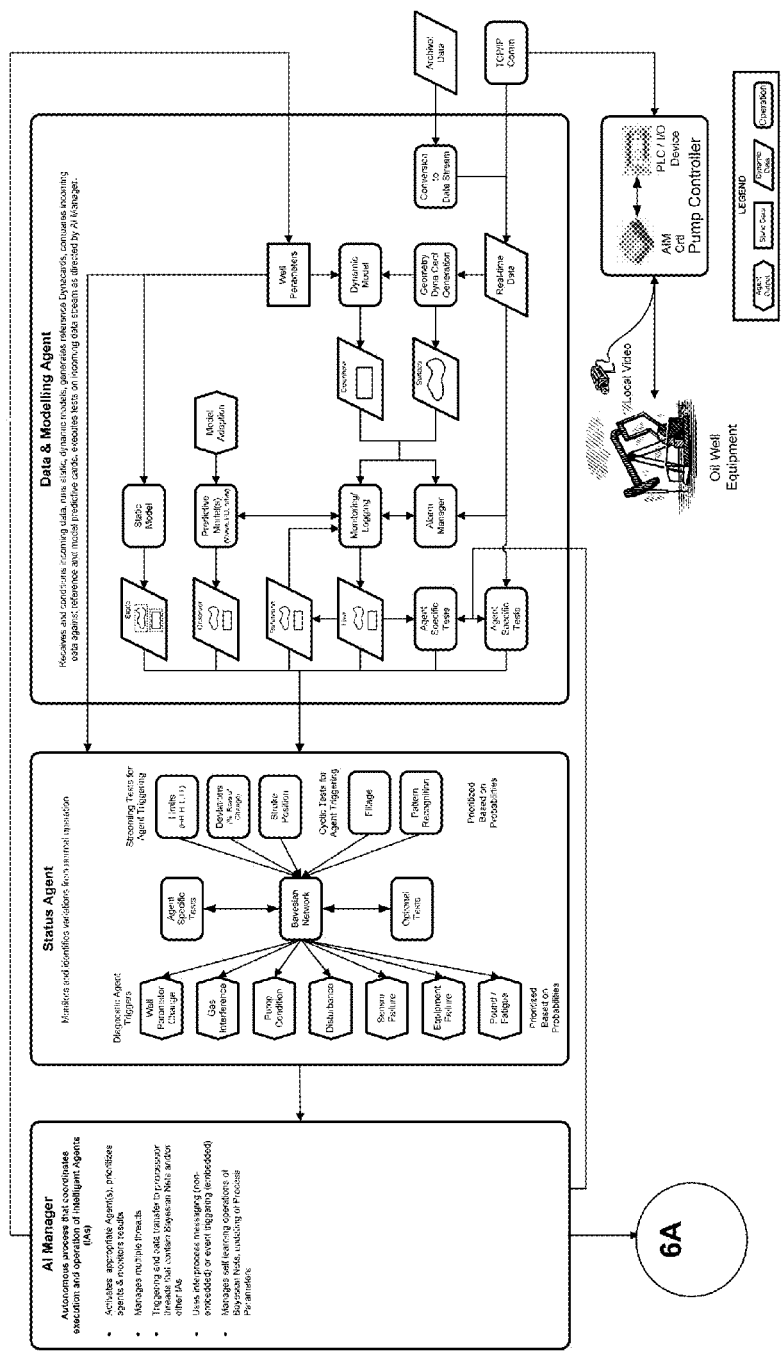
FIG. 4 is a flowchart illustrating prioritization and triggering of Diagnostic Agents by an AI Manager (FIG. 4-1) and based on real time observations and triggers from a Data & Modeling Agent (FIG. 4-2), the Status Agent (FIG. 4-1) conducting probabilistic analysis to determine the causality of deviation, prioritizing and selecting likely diagnostic agents based on process parameters, learning from solutions, updating models and issuing control instructions based on acceptable risk of process disruption or failure.
Figures 1, 4:
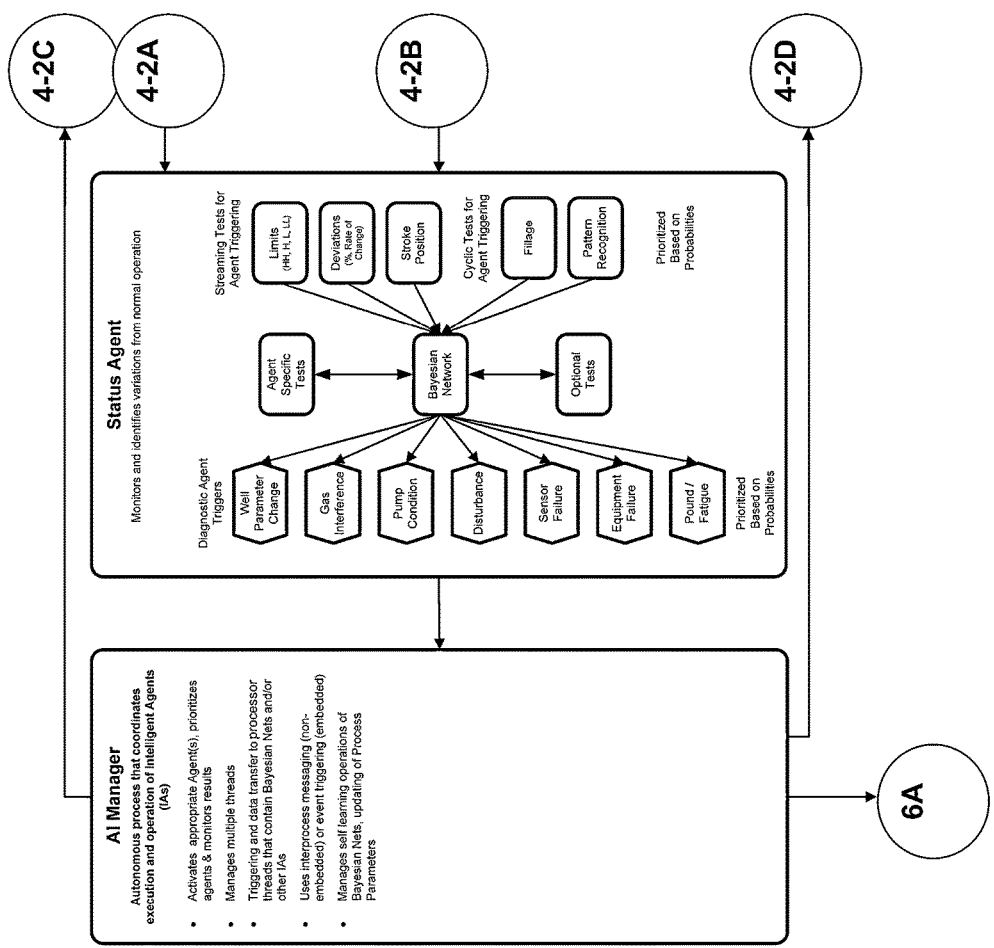
Figures 2, 4:
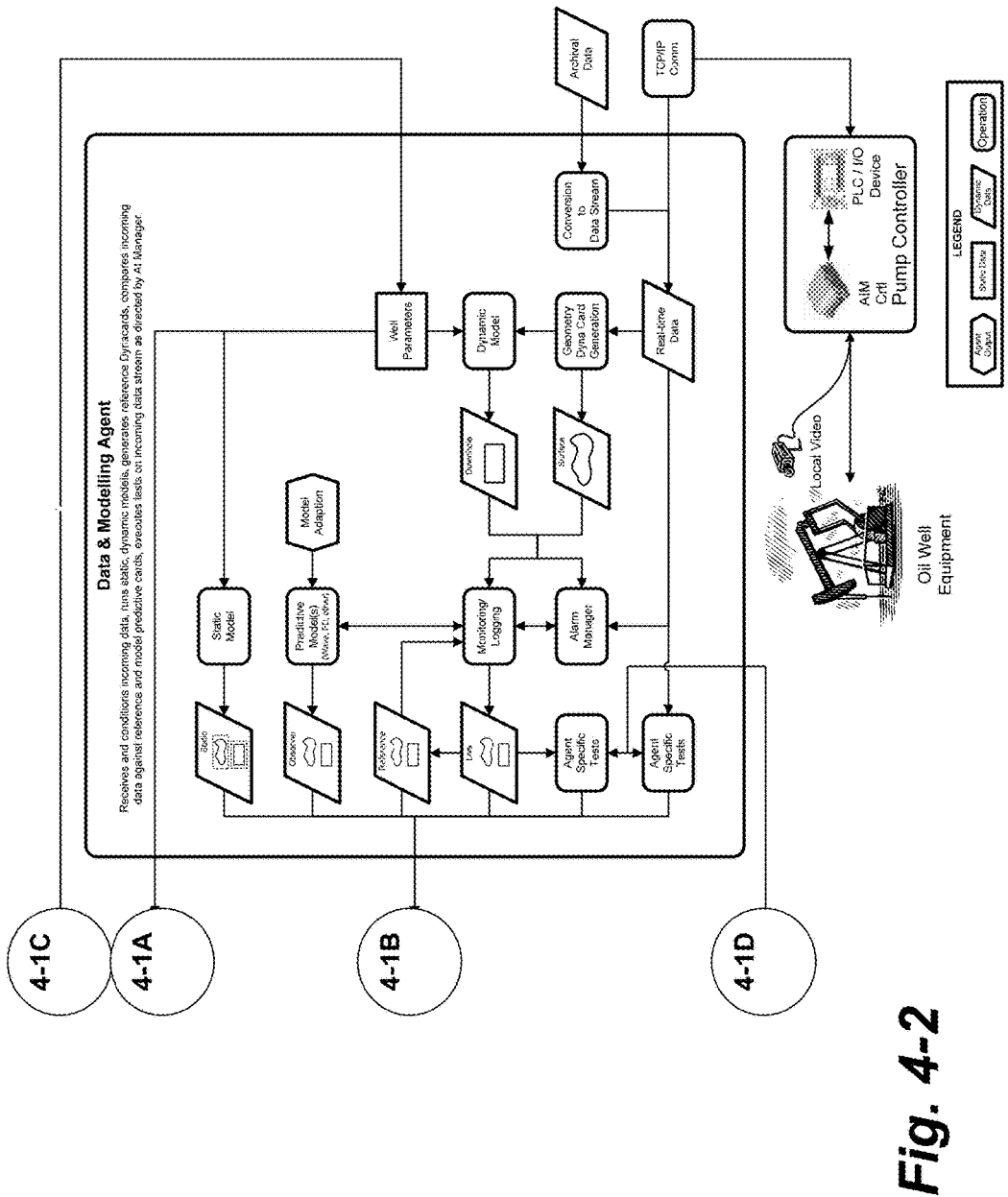

As shown in FIG. 4, the AI Manager handles priorities and triggers one or more Diagnostic Agents, based upon observations and triggers which are received from one or more Data & Modeling Agents and one or more Status Agents.

The process of the AI Manager is autonomous and asynchronous to coordinate execution and operation of the different intelligent agents (IAs). The design and configuration of the AI can change depending upon the industrial application or context for which it is being used, the system possibly requiring a different number and design of functional agents, such as Diagnostic and Control Agents. The responsibilities and of the AI Manager include:
- receives outputs from the one or more Status Agents, activates the appropriate Agent(s), dynamically prioritizes the agents and monitors results from the different agents.
- tracks the status of all active Diagnostic Agents, Optimization agents and Control Agents.
- uses results received from the Diagnostic and Control Agents to enable/disable/adjust the tests used by the Data & Modeling Agent and the Status Agent.
- oversees triggering and data transfer to different computational threads, such as IAs, many of which may contain probabilistic graphical models PGM, such as Bayesian Nets and/or other IAs.
- uses inter-process messaging (non-embedded) or event triggering (embedded).
- manages self-learning operations of Bayesian Nets and updating of Process Parameters Further, in applications with distributed, independent processes, such an oil field, the AI Manager at each individual well may network or coordinate with other AI Managers at other wells to share learned diagnoses or control strategies either directly or via a central SCADA manager.

Supervisory Control and Data Acquisition (SCADA) Manager

Systems according to embodiments taught herein having a SCADA may incorporate AI functionality of each system within its domain or incorporate additional methods or agents to monitor field scale parameters and their effects at the individual well.

The SCADA Manager may utilize the probability tables or historical data from individual wells to update the probability tables of other wells or provide these wells historical case information to enable the wells to utilize machine learning techniques to update their own probability tables.

Data & Modeling Agent

One role of the Data & Modelling agent is to monitor and track process information and to run process models based on the process information for use by other agents.

The Data & Modelling agent operates synchronously in real time, handling incoming data by running to completion each time data is received or after each completion of a cycle in a periodic process or batch process, and/or over longer periods/multiple cycles.

The Data & Modelling agent runs process model(s) and performs real time analysis and tests at each data sample and/or cycle as directed by AI Manager which acts on the behalf of diagnostic or decision agents. Tests or algorithms that require computational periods longer than time provided between data samples may be initiated and run asynchronously.

The Data & Modelling agent also performs logging of historical data.

The Data & Modelling agent operates in real time, receiving and conditioning incoming data and polling lower priority data as required. It will run kinematic and dynamic models of the equipment and processes utilizing the received data to observe and estimate the actual performance of the process. To this end, the Data & Modelling agent will generate and log performance references for comparison against incoming data.

These references will include a static model of the performance of the process based on process parameters and established operating envelopes.

The references further includes a statistically generated mean reference with standard deviations of key measured and derived process parameters based on multiple process cycles which is intended in part to filter out process noise and external disturbances. The statistically generated mean reference will be generated over multiple cycles, logged periodically, used for a limited period of time for comparison against current process performance and then replaced as newer references are generated as required or as process parameters change. Each logged reference is stored for historical analysis.

The references also include a model-based predictive reference utilizing measured and derived process parameters which incorporates a dynamic process mode and may or may not include ideal or projected outputs. This model will be compared and validated against incoming process data and will also be logged and updated periodically like the statistical reference.

In the case of reciprocating systems such as a pumpjack, the agent generates a surface and a downhole dynamometer card for each pump cycle using the kinematic and dynamic models of the surface and downhole equipment with the incoming process data. Dynamometer cards represent rod load as a function of rod position during the course of a single pump cycle consisting of a complete upstroke followed by a complete downstroke. The actual values and shape of the card are then compared or correlated with the static, statistical and predictive models as required.

Additional process parameters may be monitored including, but not limited to, tubing and casing pressures, measured or derived forces and parameters such as pump friction, pump fillage, fluid levels, rod stresses along the rod string or applied to various process equipment components, surface or downhole.

The potential to use visual information such as pictures or videos to identify production and operational issues is also recognized. For example, video of the motion of a sucker rod pump could be useful to identify mechanical issues such as belt slippage, leaking chemicals or broken components that may not be as evident from solely monitoring of process inputs. In other process such as boilers, thermal images may be utilized to identify and located hot or cool spots in a boiler tube network. The agent will include algorithms for specific tests that maybe requested by the AI Manager for use by other agents. These tests will be performed as data streams in and may be performed for all or part of a cycle or performed once a given cycle has completed. Calculations for the cyclic tests may be distributed between streamed data and the completion of the cycle to optimize processor utilization. Tests may include comparisons of incoming data against static, reference and model predictive surface and downhole cards, process/equipment operating envelopes and safety limits.

The agent will primarily transmit measured/derived data and results of tests to the Status Agent or, if required, directly to the AI Manager. The agent will internally manage the periodic logging of historical data and references. Agent specific tests and exception logging of data will occur at the request of the AI Manager.

Typical observable conditions and configured information for a sucker rod application include: Pressure: Casing and Tubing, Fluid Level, Well parameters and configuration: Measured and calculated, Rod String Completion Data, Fluid viscosity and makeup, Flow/No-Flow Detection, Vibration Sensing—Level, Motor Voltage, Current, Torque, Speed, Rod Loading: static and dynamic, Stroke Reference Position, Interlock Status.

Status Agent

The primary role of the Status agent is to identify any potential variation or deviation from normal or predicted operation occurring such as an external disturbance or a change in process conditions or parameters.

Consists of a mechanism to detect deviation from normal, ideal or predicted operation, a PGM based state model of the process, an operational envelop analysis means and pattern recognition means and a classifier to triggers the appropriate diagnostic and Control Agents and a mechanism to update inherent PGMs via machine learning techniques if required.

Monitors and identifies between the real-time data and historical data, model predictions.

It identifies whether variations significantly deviate from normal operation and initiates tests to identify potential sources or categories of sources for the variation and sets the priorities for investigation. This optimizes use of valuable and limited computation capacity.

The Operational Envelope Analysis uses a statistical mean of the process based on historical data that is periodically updated and/or a predicted/ideal model of the process. Deviations from the normal or ideal operations are identified and flagged as to their severity.

The state of the process is tracked as it moves through its operational cycle using a PGM based state model that utilizes tests on real time data to probabilistically identify the current operation state.

For example, in the sucker rod pump application, the downhole pump cycles through a upstroke where the fluid load of the pump is lifted by upward motion, the closing of a travelling valve and the opening of a standing valve followed by the downward motion of the pump, the opening of the travelling valve and the closing of the standing valve. In addition to the states of the valves, there are states of fluid and/or gas compression and decompression. As the process moves through the different states, the PGM determines the likelihood of each state based on observations and tests results. The PGM could be a hidden Markov model, Bayesian Net or like probabilistic graphical model. See FIG. 5.

A pattern recognition mechanism is included. The preferred implementation is a time series pattern recognition that provides a probabilistic match of incoming data stream to known patterns from a database to assist the process state tracking by PGM. Euclidean, dynamic time warping and dynamic derivation time warping are the preferred matching criteria for implementation although many mechanisms exist. In addition, the pattern recognition includes a classification mechanism that can identify and classify recurrent patterns that are associated with process deviations, store these patterns and track their reoccurrence in conjunction with process variables to assist with manual diagnosis or a diagnosis based on machine learning techniques using the pattern and the data observations associated with its occurrence.

Finally a classifier is used to identify and prioritize the appropriate diagnostic agents and/or Control Agents to trigger.

Probability tables of PGMs and classifiers are updated as diagnoses are confirmed and validated to improve performance The Status Agent utilizes a probabilistic graphical model(s) (PGM) as a classifier that compares process data against Process Model predictions and/or statistical historical data to identify a deviation(s) from predicted or normal operation.

Based on the nature of deviation, diagnostics or evaluation of specific process parameters may be triggered and prioritized in order to identify the source and causality.

Notice of completion of tests and their results will be sent directly to the AI Manager which will trigger and prioritize the appropriate diagnostic, optimization and Control Agents. For example, probable deviations in the process model's parameters will trigger the activation of an intelligent tuning agent.

Results of the diagnostics test and confirmation of diagnoses by the various agents will be communicated to the Status Agent via the AI Manager to further train the Status Agent. Priors for the Status Agent may be set manually or derived from probabilities established by similar wells.

It is intended that hidden or latent variables/nodes will be incorporated into the Status agent to facilitate the identification of modes, dependencies, relationships or issues not contemplated in the original design of the graphical probability networks deployed.

Initially the Status Agent would need to be iterative in nature, monitoring as process conditions persist or evolve from stroke to stroke. It would generate status conditions and alarms to be relayed to the AI Manager which would facilitate diagnosis and courses of action. Deviations that persist after several strokes may increase the probabilities of some conditions and thus a reallocation of processor computational priorities.

The Status Agent would need to be capable of recognizing changes to processes or well conditions that evolve on a gradual level over the course of hours, days or months requiring access to historical trending of well conditions. It may be determined that the Status Agent may be divided into two separate agents to address short and longer term process variations.

It is also recognized that this agent may be reduced in scope to exclude generating alarm for some system statuses that are better left to deterministic or logic type control.

The presence or absence of control action to remedy a known deviation may be incorporated into the Bayesian Net as resolving the condition which may take several strokes or more and generate additional process variations.

Diagnostic Agents

A role of the Status agent is to identify any potential variation or deviation from normal or predicted operation occurring such as an external disturbance or a change in process conditions or parameters. See FIG. 6.

Diagnoses causality of variation from normal operation or MPC. Operates asynchronously after being triggered Employs a PGM that identifies the probable condition of the equipment and/or the causality for the deviation based on tests and known data.

May request test(s) by data & modeling agent via AI Manager.

Outcomes from the diagnostic agent may be used to trigger additional agents such as the model tuning agents that will identify and quantify variations in process parameters.

In a preferred Diagnostic Agent implementation, a causal PGM model with three main levels or categories of nodes would be used that share features found in clinical diagnoses.

Top level nodes are comprised of process parameters, independent or ambient conditions, states of the process that can be observed (directly measured or applied to the process) or are known with relative certainty. (Predispositions)

Mid-level nodes are the conditions that are potential diagnoses for the underlying conditions that are contributing to the deviations in the process. (Diseases)

Bottom level nodes are results of tests, observables, symptoms or metrics which are dependent on the underlying conditions from which their inherent probabilities are used to identify the underlying conditions with an acceptable degree of certainty. (Diagnostic Tests, Symptoms)

Diagnostic Agent Example:

Process Deviations Due to External Disturbances: Gas Interference

Figure 5:
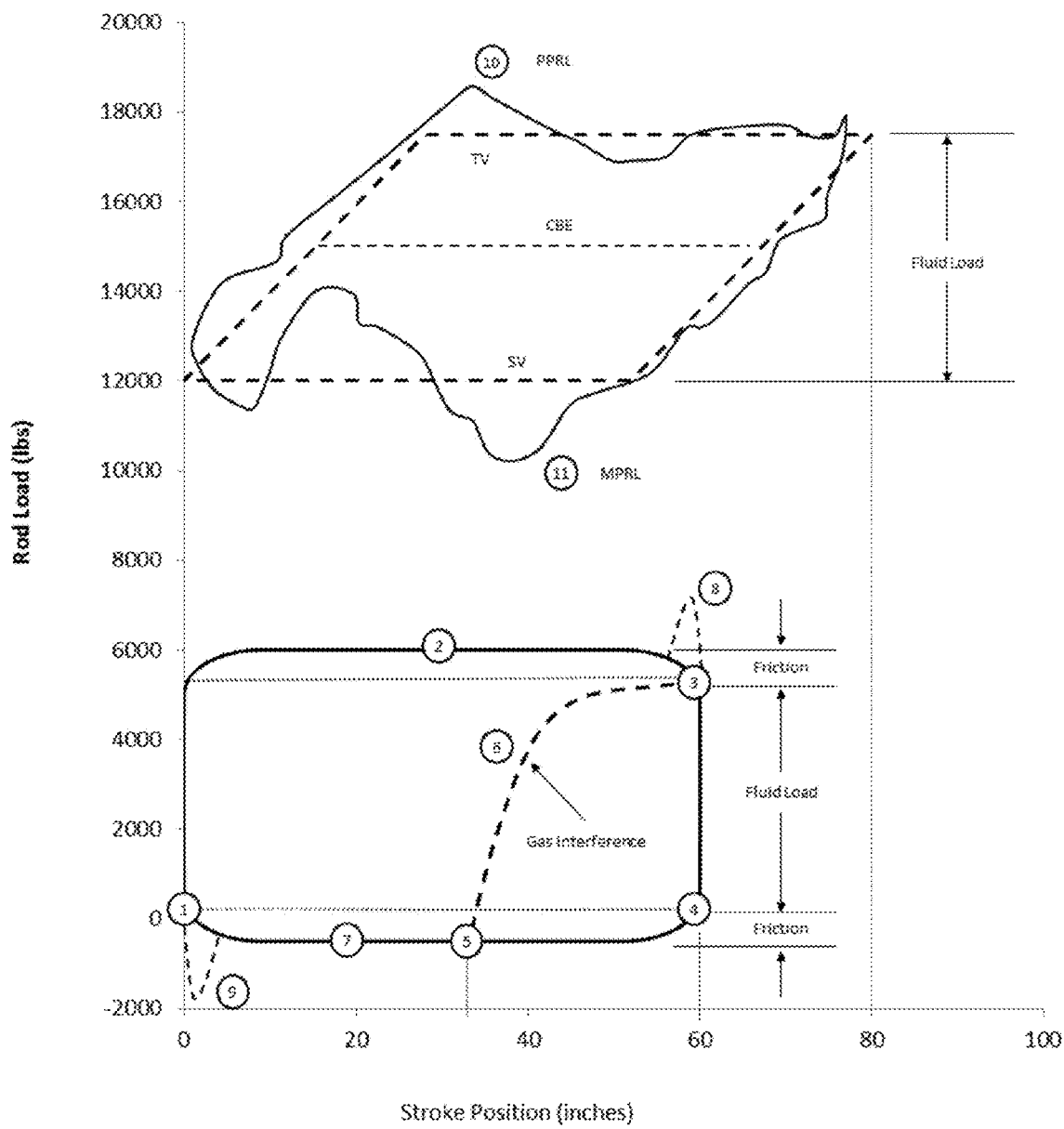
FIG. 5 is a diagrammatic representation of an ideal pump cycle, a known diagnostic for gas interference, and an observed pump cycle, the system conducting a determination, by PGM, of the state of the cycle of the pump and the likelihood that the gas interference agent (FIG. 6, 6-3) should be invoked.
Figure 6:
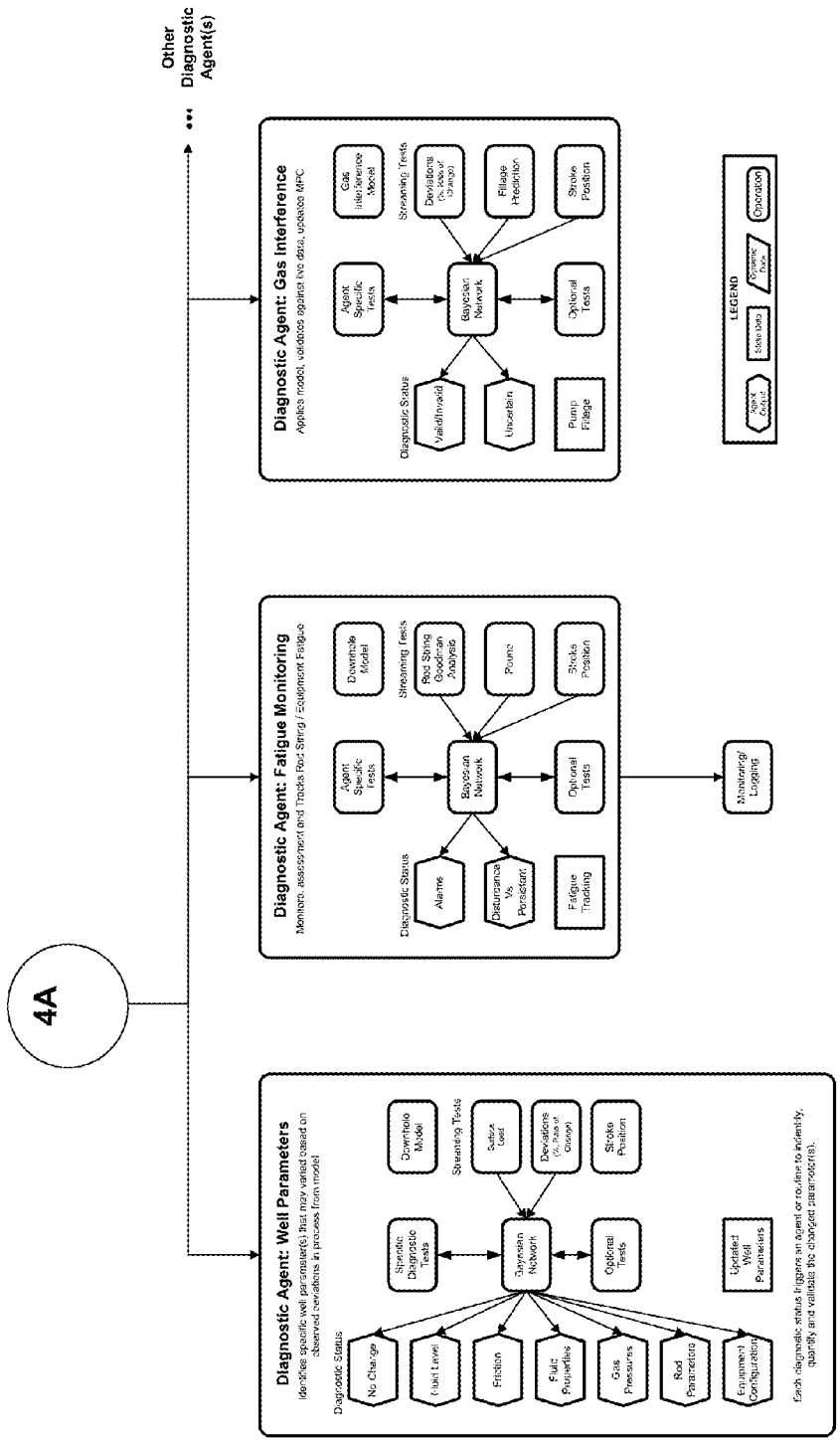
FIG. 6 is a flow diagram of optional and possible Diagnostic Agents that could be recruited upon the identification of any potential variation or deviation from normal or predicted operation in a pump operation such as an external disturbance or a change in process conditions or parameters as determined by a Status Agent of FIG. 1, Agents for well parameters (FIG. 6-1), rod fatigue monitoring and gas interference (FIG. 6-2) being shown, each Agent also able to select through a probabilistic determination which tests and known actors might be at play.
Figures 2, 6:
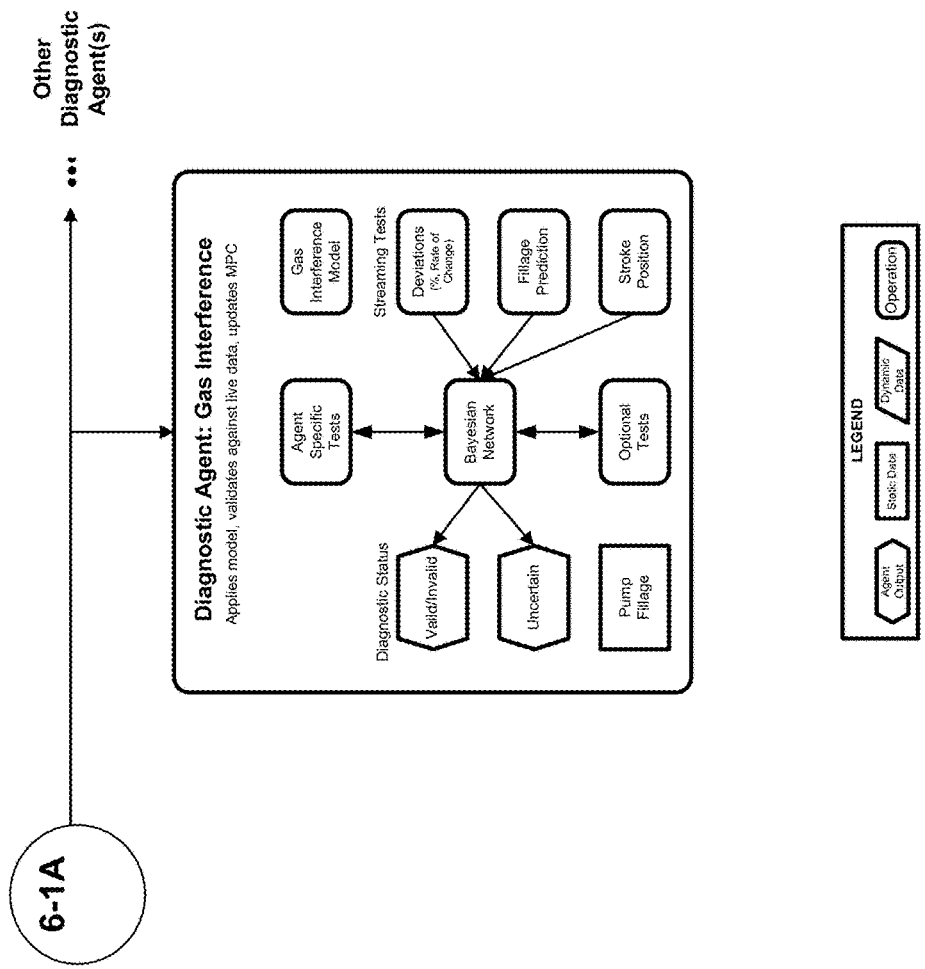

As shown in FIGS. 5 and 6, a Diagnostic Agent is requisitioned or initiated to apply a gas interference model, to validate and quantify the condition and to facilitate updates or adjustments to the model predicative control.

Tests applied in the model will include pattern recognition of gas interference in the downhole load position profile, whether or not sufficient load has been dropped to account for fluid loads and friction, rate of change of loads with respect to position and time, whether timing, positions and rate of change of loads are consistent with models of gas and fluid compression given the other observed deviations in the downhole pump loads and potentially the rod loading at the surface. In FIG. 5, the various dynamometer are shown, the various stages of the operation being identifies by: PPRL—Peak Polish Rod Load, MPRL—Minimum Polish Rod Load, CBE—Counterbalance Effect, TV—Travelling Valve, SV—Standing Valve, and numerical process points identifying: 1—Start of DH Upstroke, 2—Fluid Load Picked up, SV open, TV closed, 3—Top of DH Stroke/Start of DH Downstroke, 4—Fluid Load Being Dropped, TV & SV Closed, 5—Gas and Fluid Compression complete, SV open, 6—Gas compression in progress, TV & SV Closed, Pump Fillage identifiable, 7—Fluid Load Picked up, TV open, SV Closed, 8—Pump plunger hitting top of pump, and 9—Pump plunger hitting bottom of pump. A sample deviation related to gas interference is shown in dotted lines.

Significant gas interference can result in fluid pound which stresses the rod string and equipment or be indicative of a gas lock or pumpoff condition necessitating a shutoff of the equipment to allow fluid levels in the well to rise sufficiently for pumping to resume. Diagnostic agent may trigger yet another separate Diagnostic agent to assess the contributions to equipment fatigue.

The probability of the diagnosis will be compared by the AI Manager to assess the likelihood of a correct diagnosis based on the results of independent diagnoses for other conditions.

Diagnostic Agent Example: Fatigue Monitoring

Further, as required by the AI Manager, a further Diagnostic agent for Fatigue monitoring can be recruited that monitors, assesses and tracks rod string equipment fatigue.

Figure 7A:
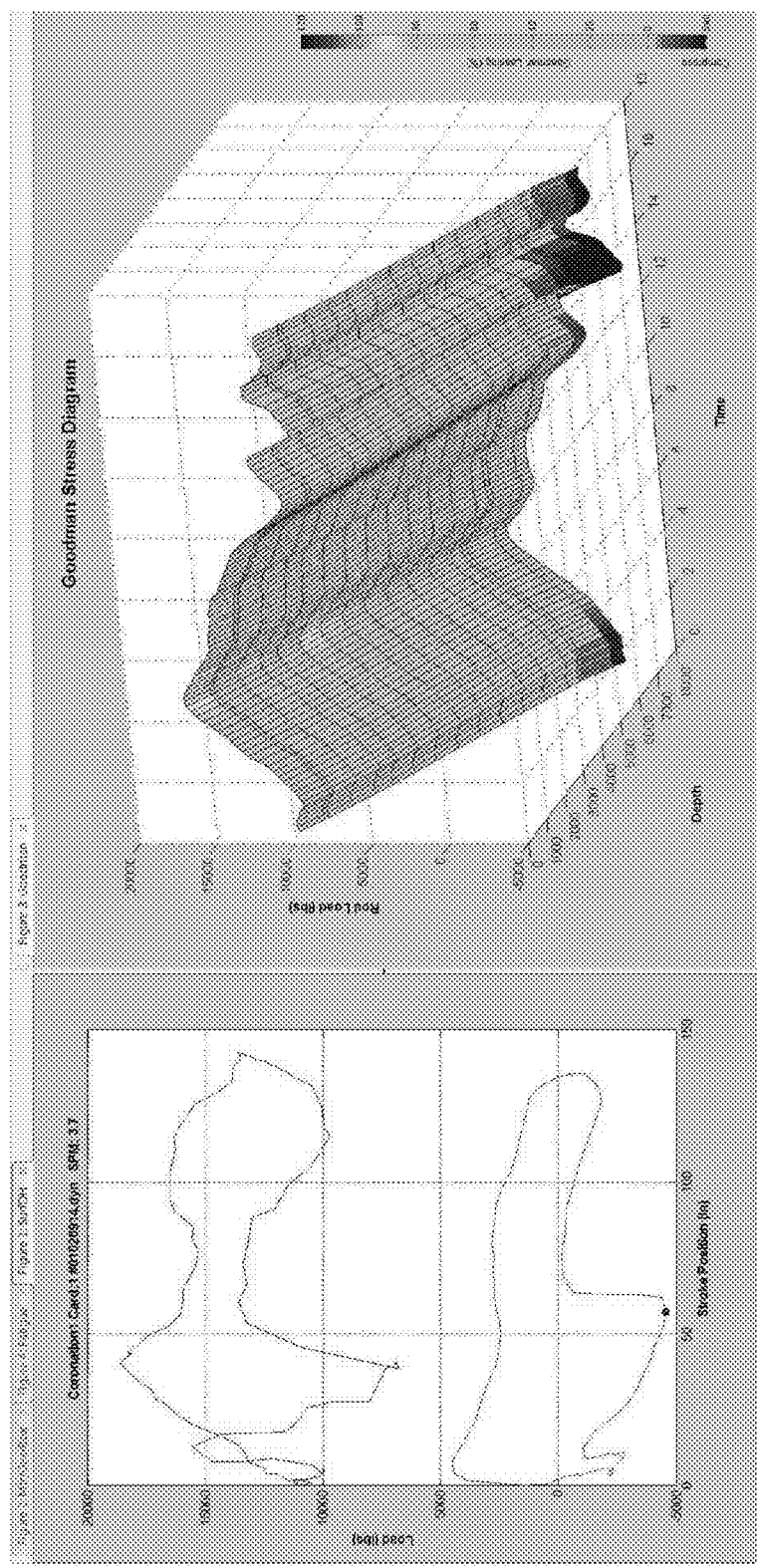
FIGS. 7A and 7B illustrate three-dimensional (3D) plots of the forces on a rod string over the entire cycle, the surface shown in FIG. 7A being typically colorized (FIG. 7B) to show the Goodman loading for each section of the rod string throughout the cycle enabling a user to easily identify where in the stroke the rod string is being overstressed.
Figure 7B:
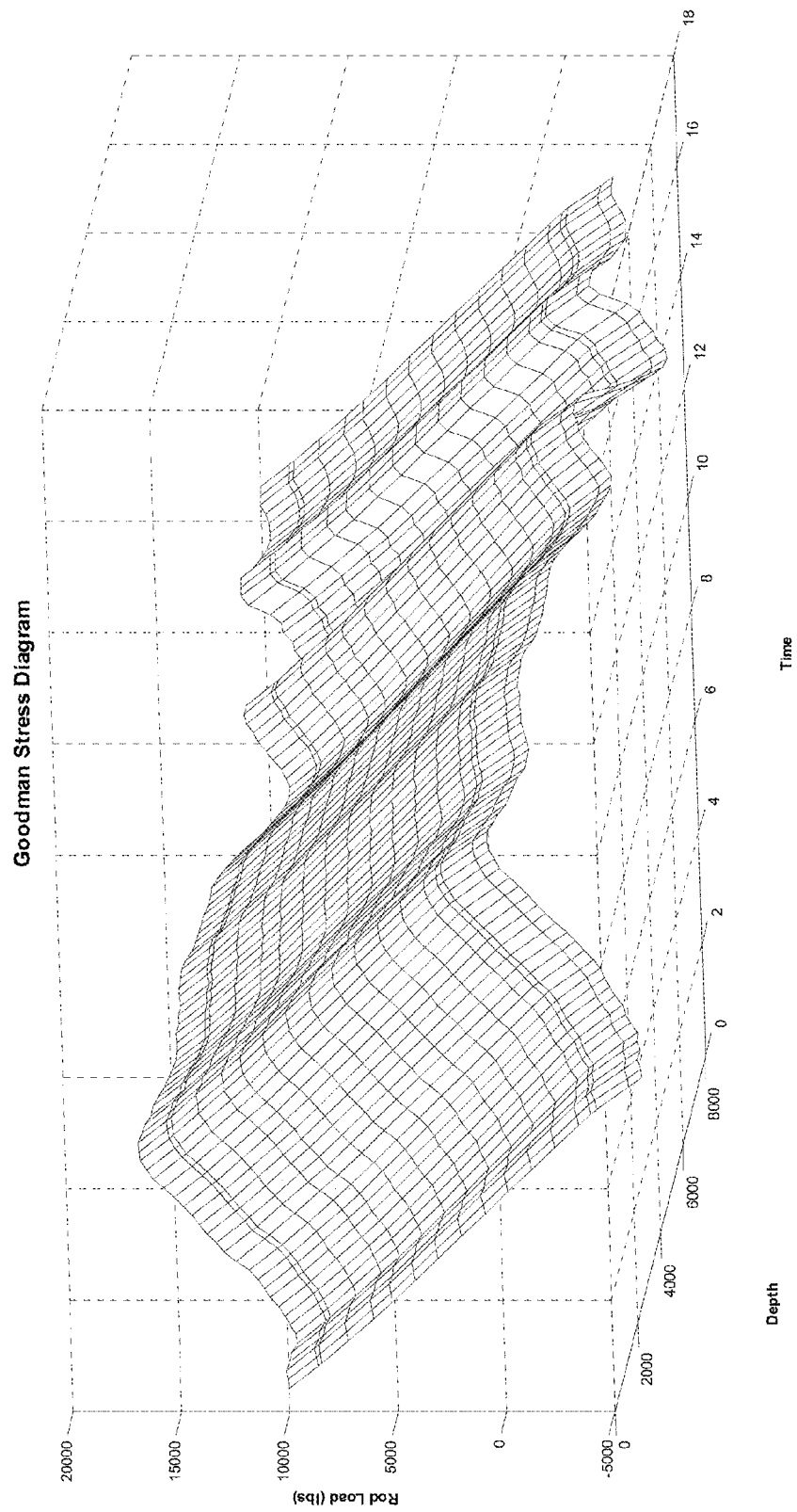

Forces applied to the rod during operation are calculated by the downhole model and resolved to fixed segments of the rod string. The stress and fatigue resulting from these forces is quantified and tracked. Goodman Analysis methods are used to assess how the stresses applied in each stroke impacts the fatigue and life cycle of the rod string. FIGS. 7A and 3B shows a three-dimensional plot of the stress and fatigue loads on the rod string over the entire cycle. The surface is typically colorized to show the Goodman loading for each section of the rod string throughout the cycle enabling a user to easily identify where in the stroke the rod string is being overstressed.

Likelihood of damage to the rod string in the short and long term is assessed including its impact on the mean time between failures (MTBF) for the equipment.

Unacceptable levels of stress are flagged or alarmed and returned to the AI and Alarm managers so that specific control action may be determined and implemented.

Process Model Parameter Tuning Example:
Well Parameter Tuning Agent for Downhole Observer Model of Sucker Rod Pump The Process Model is "self-tuning" or learning. This is outside of the failure of an equipment or external disturbance which are intended be addressed with specialized intelligent agent(s) (IA) of their own.

A role of the Process Model Parameter Tuning Agent is to ensure that the process model(s) accurately reflect the actual process. Triggered by the Status agent and Diagnostic Agents, the Tuning Agent identifies, evaluates and quantifies potential variations in model parameters, process variables and equipment condition that contribute to deviations between the process and the process model.

As changes in well conditions persist from stroke to stroke or evolve on a gradual level, there is a need to ensure that process model(s) remain accurate. Probable deviations in the process model's parameters will trigger the activation of the Tuning Agent.

The Tuning Agent:

Employs a PGM that identifies the probable variations of process parameters and/or equipment condition that contribute to the process model based on tests and known data.

Using the probabilities for process parameter variation, the model tuning agent can initiate and prioritize numerical or iterative methods with the process model to identify and quantify the possible contributions to the observed deviations and validate them against current data observed from the process. Once the potential sources are quantified, the probability of the variations required to correct the process model are probabilistically considered using a decision net that takes into account the risk associated with incorrect diagnoses.

Specific metrics, tests or measurements that are outside of regular operation may be necessary to assist in the diagnosis and tuning of the process model(s) and would be performed on an as needed basis; however, once "tuned", the need for these tests should be minimized so as not to adversely affect production or consume limited computing capacity.

Basic Concept of Operation

Using historical sequence of mean, average, or typical process cycles, the Process Model Tuning Agent identifies the most likely causes for the observed deviations in the historical sequence, and validates the cause and corrects the parameters in the model.

In the case of the sucker rod pump/oil well, many different parameter changes or conditions can contribute to a process deviation.

Well conditions can change very quickly from one stroke to the next as in the case of a failure of mechanical systems, pumpoff or gas lock, sticking of the rod string, etc. These may need to be identified and flagged for alarming, change of control mode or action depending on the nature of the condition. Other conditions can be measured such as gas pressure, temperature, pump speed, rod loading, etc.

Process Model parameters change more gradually but also can be affected by well conditions as they change. For example, a leak in the tubing can affect fluid levels and pressure in the tubing.

Some of these well conditions can affect multiple parameters. For example, temperature can affect fluid viscosity and cause wax to precipitate increasing friction. Fluid level can affect downhole pressure and buoyant rod weight affecting friction, viscosity and other observed forces.

Some parameters change slowly over hours or days versus from stroke to stroke. The agent would need to assess the rate of change of parameters and targeting those most likely to influence the observed error over the time observed for it to manifest.

The scope of operation of the agent would ideally be limited to the tuning of the downhole model and but also capable of identifying a change that is beyond that scope (independent of the model) such as equipment failure or some external disturbances. The IA would then direct other agents, algorithms, control modes or alarm managers to engage to resolve the deviation in the process from the model.

To tune the model, it may be advantageous to have an IA provide direction as to which parameters and the range of values for those parameters so that an algorithm may more expeditiously search for corrective values rather than a global search. It may also assist in identifying whether one or more parameters need adjustment.

Agent Implementation

The Process Model Tuning agent would compare historical records of the process with the current record, taking the current measured values of process variables and derived process metrics to identify and validate which model parameter(s) have varied and determine the corrected values.

In the case of the pumpjack, there are significant variations from one dynamometer card to the next which may mask changes in Process Model parameters. To overcome this, multiple dynamometer cards would be used to generate a distribution of which the mean and variance/standard deviation would be saved on a periodic basis in the form of a Fast Fourier Transform (FFT). A historical "mean" card be compared to the most recent mean or the current output of the Process Model to identify shifts in the metrics.

In a preferred IA implementation, a causal PGM model with three main levels or categories of nodes would be used in a manner similar to that used in a diagnostic agent.

Top level nodes are comprised of process parameters, independent or ambient conditions that can be observed (directly measured or applied to the process) or are known with relative certainty and can influence the likelihood a parameter has changed. (Predispositions)

Mid-level nodes are the Process Model parameters that cannot be directly measured with certainty and are subject to variation. (Diseases)

Bottom level nodes are observables, symptoms or metrics which are dependent on the model and well conditions or the outcome of tests that can be applied to further resolve the Process Model parameters and range of variations. (Diagnostic Tests, Symptoms)

Figure 8:
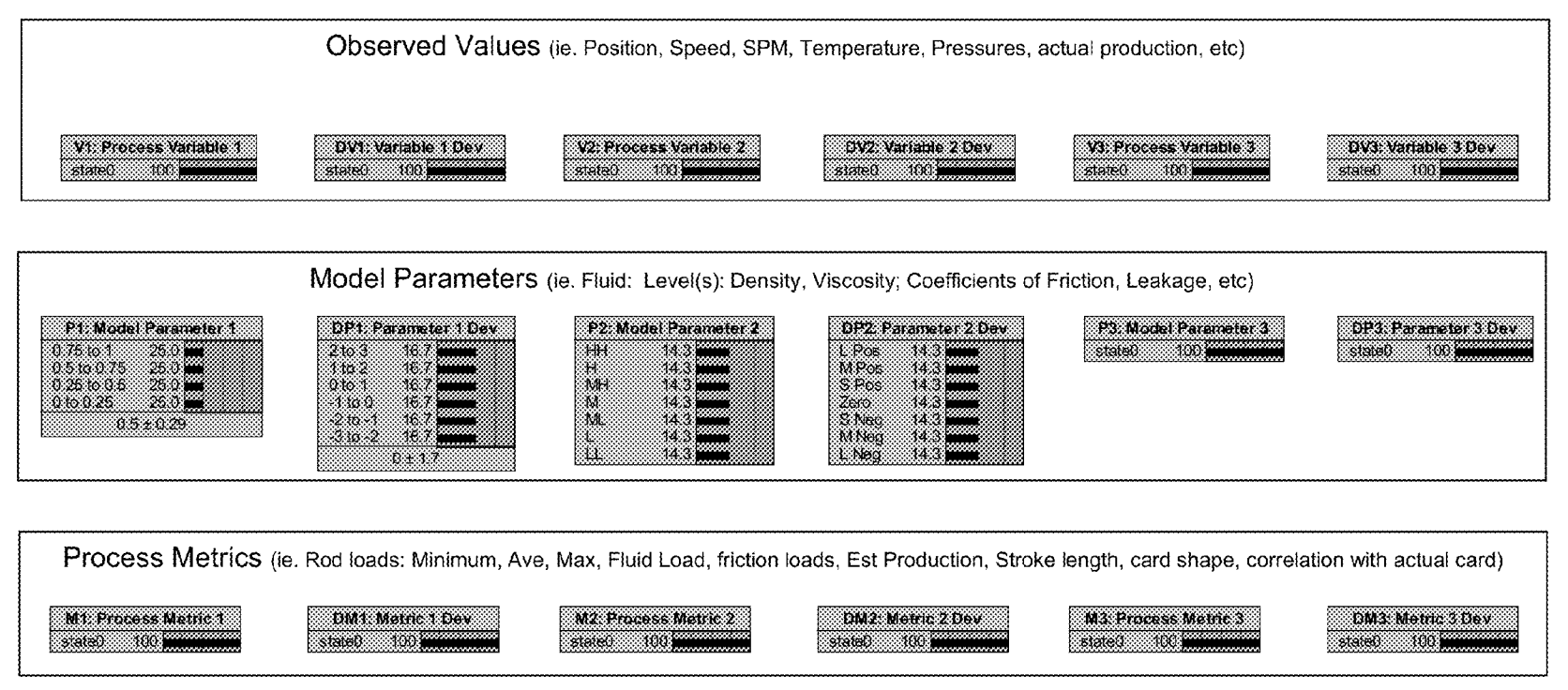

FIG. 8 shows a grouping of the various nodes that could be used to represent the values in the process, model and metrics.

The probabilistic graphical model for the agent comprises two main components: a mapping of the possible range of process metrics and probability tables of the likelihood that the process model parameter has changed.

The first component is a mapping of the possible range of process metrics that would result from the range of process variables and process model parameters. This mapping may be of absolute values or deviations from nominal values for variables or parameters as required. In essence for a given instance or range of process variables and a specific instance of the model parameters and the metrics would be determined based on the model. It is possible that some or all of the variables, parameters or metrics could be represented as discrete ranges or continuous distributions and determined through an exhaustive iteration of the model for all values. Alternatively, the mapping could be based on the causality between the various variables and process model as opposed to a dependencies completely derived via machine learning and exhaustive simulation of the process over the range of possible variables and parameters.

The second component includes probability table(s) or distribution(s) of the likelihood that the process model parameter has changed since the last historical record was taken. This could be based on historical data but also include calculations. One example of a calculation would be the likelihood of a fluid level change based on the possible range of fluid volume produced given the time between current and historical records.

Figure 9:
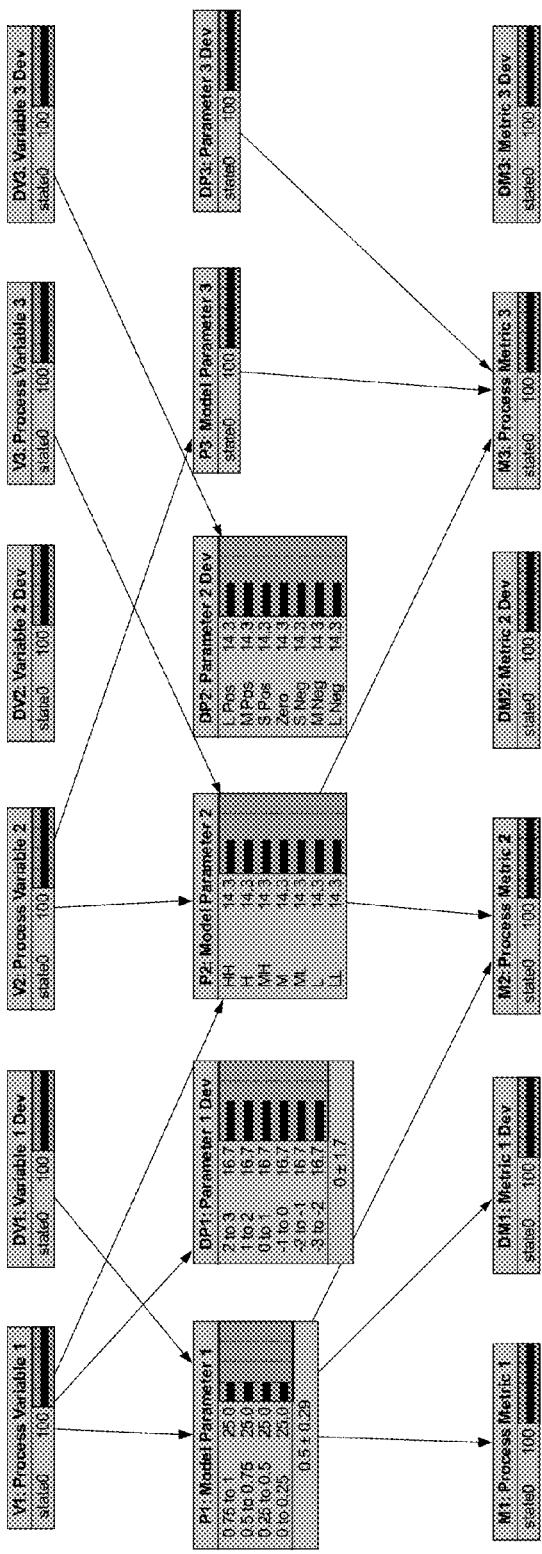
FIG. 9 illustrates the learning of a structure resulting from the combining of first and second components to provide a causal Probabilistic Graphical Model.

With reference to FIG. 9 that illustrating a process model learned sensitivity with a learned structure, mapping and likelihood of change are combined and learning the structure provides a causal Probabilistic Graphical Model (PGM).

For a given set of process variables and metrics, the PGM identifies the most probable model parameter to have changed and trigger specific numerical methods to derive the exact values required to correctly tune the model. The PGM and associated "tuning" algorithms are able to operate in situations where multiple model parameters may have changed. This may involve iterating the predictive model with actual or historical results to converge on revised process parameters.

It is also possible that the agents would initiate or request supplemental tests so that the source of the deviations can be diagnosed and validated.

The goal is to efficiently and automatically tune the model as the process is running in the background. The IA may also utilize real time data as part of the effort to validate the tuning before locking in the revised parameters. The specific process parameter(s) that have changed would be quantified and validated using the process model(s) and real time data and referred to the AI Manager for updating process parameter and probability tables for all related IAs.

The agent described herein is not intended to be directly in the control loop. It may also act as resource manager to queue other agents to initiate an investigation into higher level well operations and conditions by determining the source of deviations is not likely to be related to variation in the process model parameters.

In the case of the pumpjack, operation, using a variable intra-stroke speed may require a different PGM than that of the fixed intra-stroke speed as the variation of the speed adds significant complexity and can greatly affect the metrics and learned structure to identify and correct process model parameters. This increased complexity also greatly increases the degree to which the process can be optimized and the value added of the overall method and apparatus.

Model Configuration

Certain data pertaining to the well "completion" is known. That being said, in the course of operation, the initial model will be validated against the configuration information provided. This would pertain to the type of equipment installed and its specific configuration. The configuration information is likely to change during operation. Such information in the cyclic pump controller context includes:
- Rod string types, lengths, properties and placements within overall rod string
- Pumpjack type, geometry, gear ratios, operating limits
- Downhole pump, type, dimensions, operating limits, other info
- Tubing type and anchors
- Orientation and deflections of well as drilled
- Other equipment downhole or on the surface that could impact dynamic model performance
- Rod scrappers, Spacers, and the like Process Variables Process variable can include but may not be limited to:
- Pump speed and position
- Gas pressure in the casing and in the tubing
- Temperature(s) at surface: ambient, flowline
- Actual Production.

Process Model Parameters

There will be information on the fluid being produced. These values may change gradually with time and production rates.
- Fluid Level in the casing and in the tubing
- Fluid Density, Viscosity (static and dynamic)
- These values will change with depth/pressure, temperature, % of oil, water gas or other fluids (i.e. water cut).

Process Metrics

There will be other information on the status of the well and downhole conditions. Some of this information can be measured, calculated or inferred/approximated based on the information on well configuration, direct measurements or other conditions in if known.
- Surface and Downhole load measurements with respect to time and/or position in the pump stroke
- Temperature downhole and gradient to the surface
- Static rod loads downhole and gradient to the surface
- Relative and absolute contributions of Fluid weight, friction, etc to surface and downhole card, and
- Operator input or manual tests may be requested.

Control Agents

Figure 10:
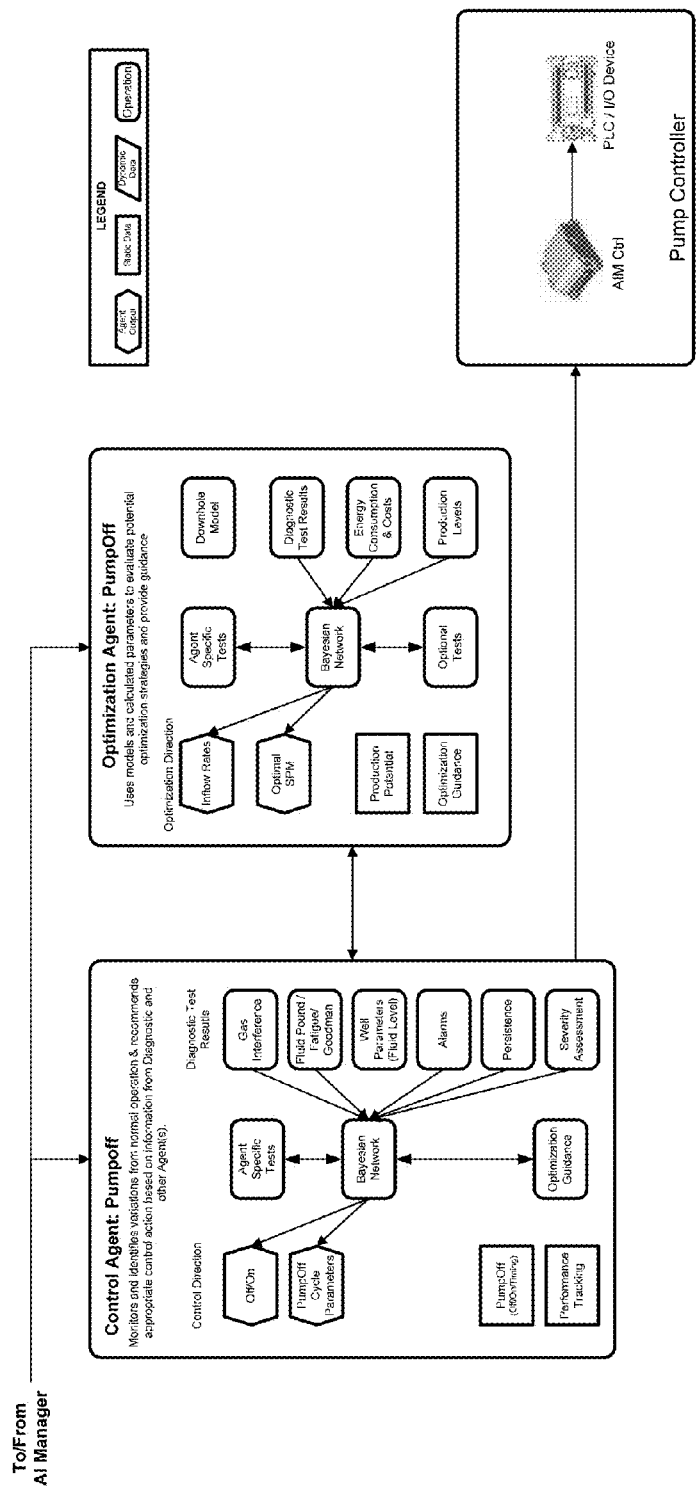
FIG. 10 is a diagrammatic representation of a role of a Control Agent in evaluating, establishing risk of specified actions and recommending appropriate control action based on diagnostic results (FIG. 10-1) and further input from Optimization and Diagnostic Agent(s) (FIG. 10-2) for possible optimization opportunities prior to the precise control action to be taken.
Figures 1, 10:
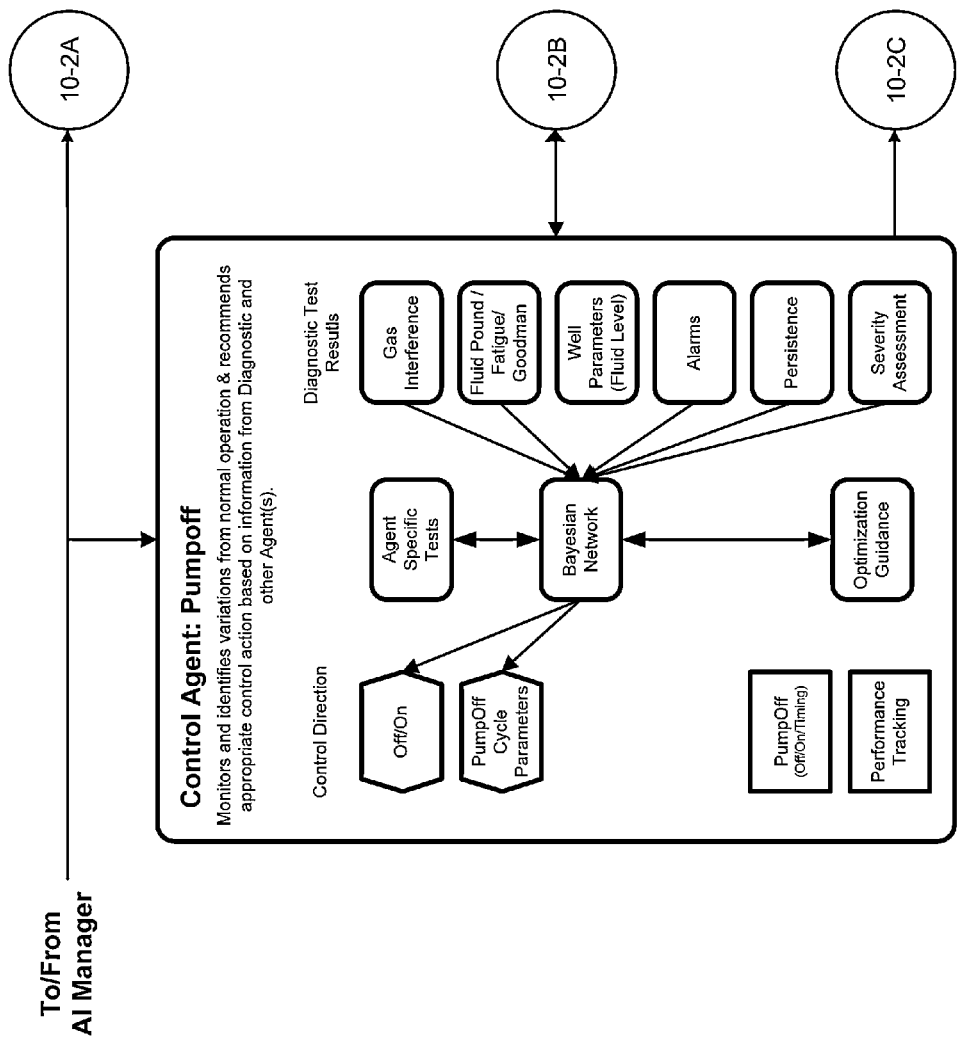
Figures 2, 10:
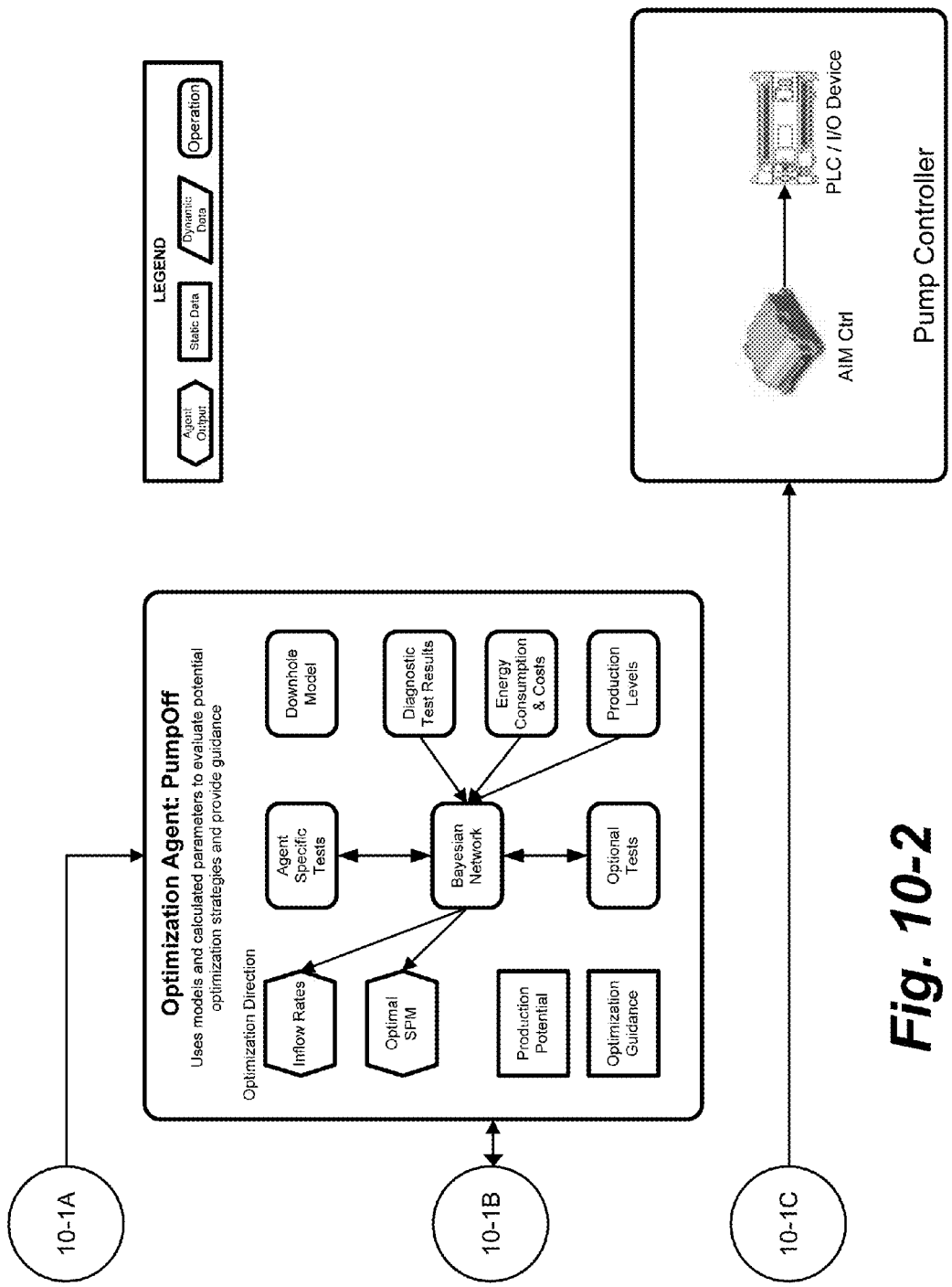

The primary role of a Control Agent is to evaluate & recommends appropriate control action based on diagnostic results and input from Optimization and Diagnostic Agent(s). It typically uses using a probabilistic decision net that takes into account the risk associated with control action. See FIG. 10.

Control Agent Example:

Pumpoff Agent for Downhole Observer model of Sucker Rod Pump

The Control Agent monitors and identifies variations from normal operation & recommends appropriate control action based on information from Diagnostic Agents and other Agent(s). Actions may include Off/On direction or adjustment of pumpoff cycle parameters such as the on and off durations.

For example, gas interference may result in some fluid pound that may or may not be within allowable rod stress limits. The Fatigue Monitoring Agent will quantify the fatigue being experienced by the rod string and its impact on the MTBF. The persistence of the conditions, the severity and external conditions may dictate singular or multiple courses of actions. In the event of multiple courses of action or condition that have not been previously encountered, the Control Agent may trigger an Optimization Agent to access and recommend the best strategy.

Figure 11:
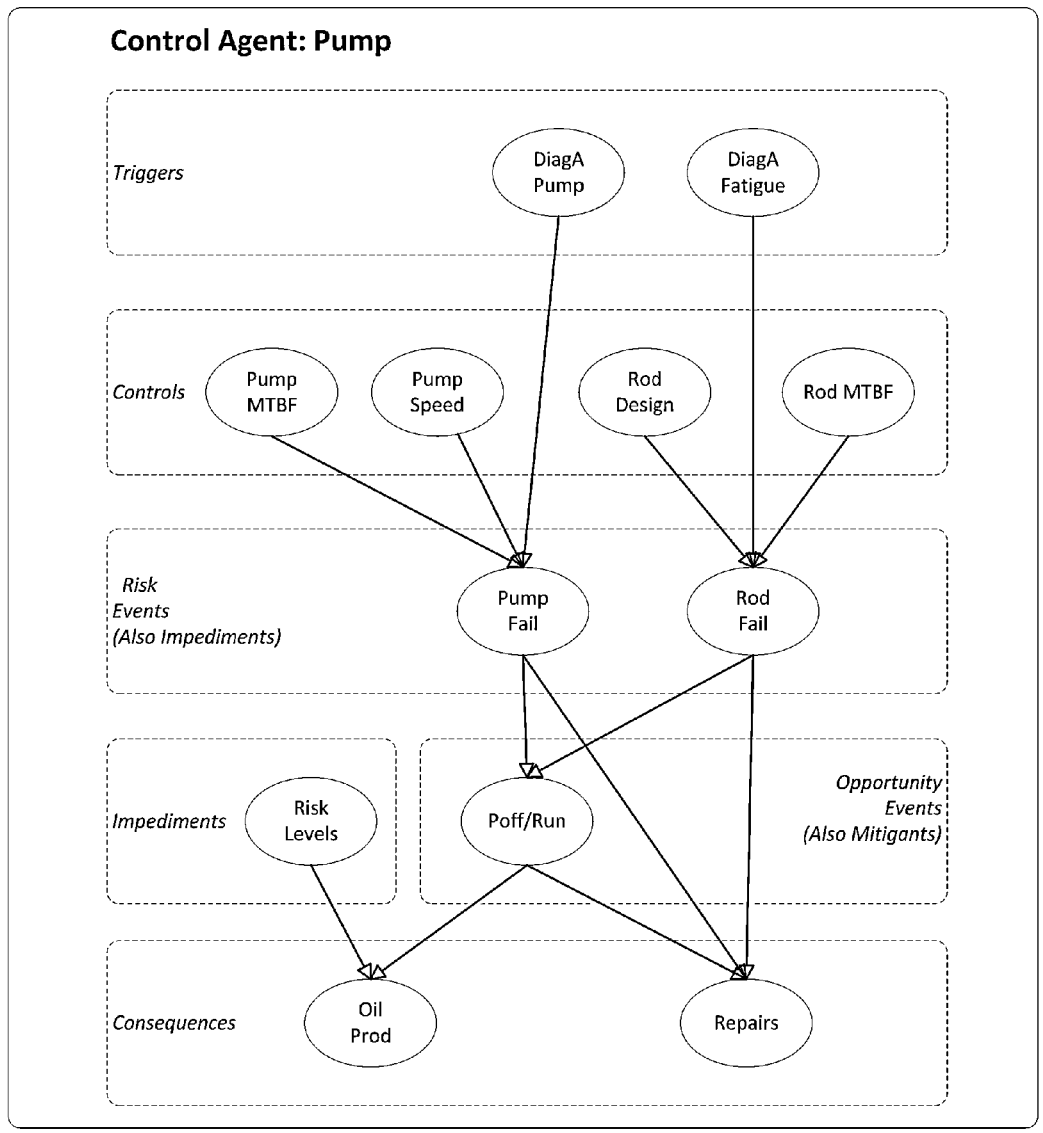
FIG. 11 is a diagrammatic representation of a possible configuration for a Probabilistic Graphical Network for the pump embodiment of FIG. 1, namely using probabilistic methods for determining causality and implementing control actions given the means for control, risk and consequences of the actions including objectives to optimize performance balanced with considerations to opposing objectives.

The severity of the fatigue, probability of failure, cost of repair, control options to reduce fatigue and the opportunity cost of lost production or the value of increased production would factored into a PGN decision net based on risk and opportunity to evaluate the course of action. A possible configuration for a PGN is shown in FIG. 11. This agent integrates the results of the various Diagnostic Agents and make control direction decisions. It may also alert the operator to design issues or potential mitigants such as reducing the pumping speed. The Control Agent is a learning agent for learning the best control action for various conditions from the recommendation of Optimization Agents and the success of earlier recommendations.

Optimization Agents

A role of an Optimization agent is to use models and calculated parameters to evaluate potential optimization strategies and provide guidance. The Agent typically uses a probabilistic decision net that takes into account opportunity or the risk associated with different optimization strategies action.

Additionally, a process simulation can be utilized to map exhaustively, or selectively, the process response to process variables, their range of operation and potential deviations such that changes to a process can be determined probabilistically and represented as PGN, potentially via machine learning techniques. When combined with historical observations of the process, this enables a means of process optimization that is highly deterministic in nature without exhaustive simulations and/or numerical methods in real time.

Using machine learning techniques, process responses such as energy consumption or production output could be represented in a PGN and used to provide guidance to a numerical optimization means. The guidance could encompass identifying a compact range for the numerical search to converge on an optimal solution for the operating parameters or in the event of a process with high levels of certainty, provide the optimal operating parameters directly to control. In an alternate embodiment, the process variables could be represented as Fourier series or other approximation means and a probabilistic mapping of the global responses of the process could be generated as a function of these Fourier coefficients. This provides a unique advantage over other optimization methods as it can greatly reduce the time required to determine a local or a global optimum for the process in real time.

The probabilistic mapping of the process could be computed in the background of a processor controlling the process or on a separate processor which could also utilize parallel computing methods to reduce the elapsed time, and generate the probability tables for the optimization PGN.

In the case of oil well pumping system, local or global optimizations of complex intrastroke variations of pump prime mover speed to optimize the well such as those of U.S. Pat. No. 6,890,156 to Watson (pumpjack speed profiling) could be performed with significantly reduced computation compared to other numerical optimization means.

Uses process models and calculated parameters in conjunction with numerical or iterative methods to evaluate potential optimization strategies and provide guidance. Operates asynchronously after being triggered.

For example, in the sucker rod pump application controlled by a fixed speed motor, the agent may use statistical or cumulative pump fillage and run time to establish well inflow rates and utilize these to determine optimal pump on and off cycles to maximize production based on acceptable fatigue limits to the sucker rod string and/or provide guidance for setting the optimal strokes per minute to operate the pump. It may identify situations where a control strategy such as PumpOff may or may not be used based on multiple conditions including but limited to production and energy requirements, energy savings, fatigue, external temperatures that may impact performance such as freezing of lines during winter, etc.

In a sucker rod pump application where the motor speed is variable over multiple cycles via a variable speed or variable frequency drive it may direct the Control Agent to vary the speed of the drive.

In a sucker rod pump application where the motor speed is variable within the stroke such as that of (Watson U.S. Pat. No. 6,890,156), different speed profiles may be determined based on the process model, predetermined speed profiles initiated or adjusted and provided to the Control Agent for implementation.

Pumpjack Controller—Embodiment

Figure 12:
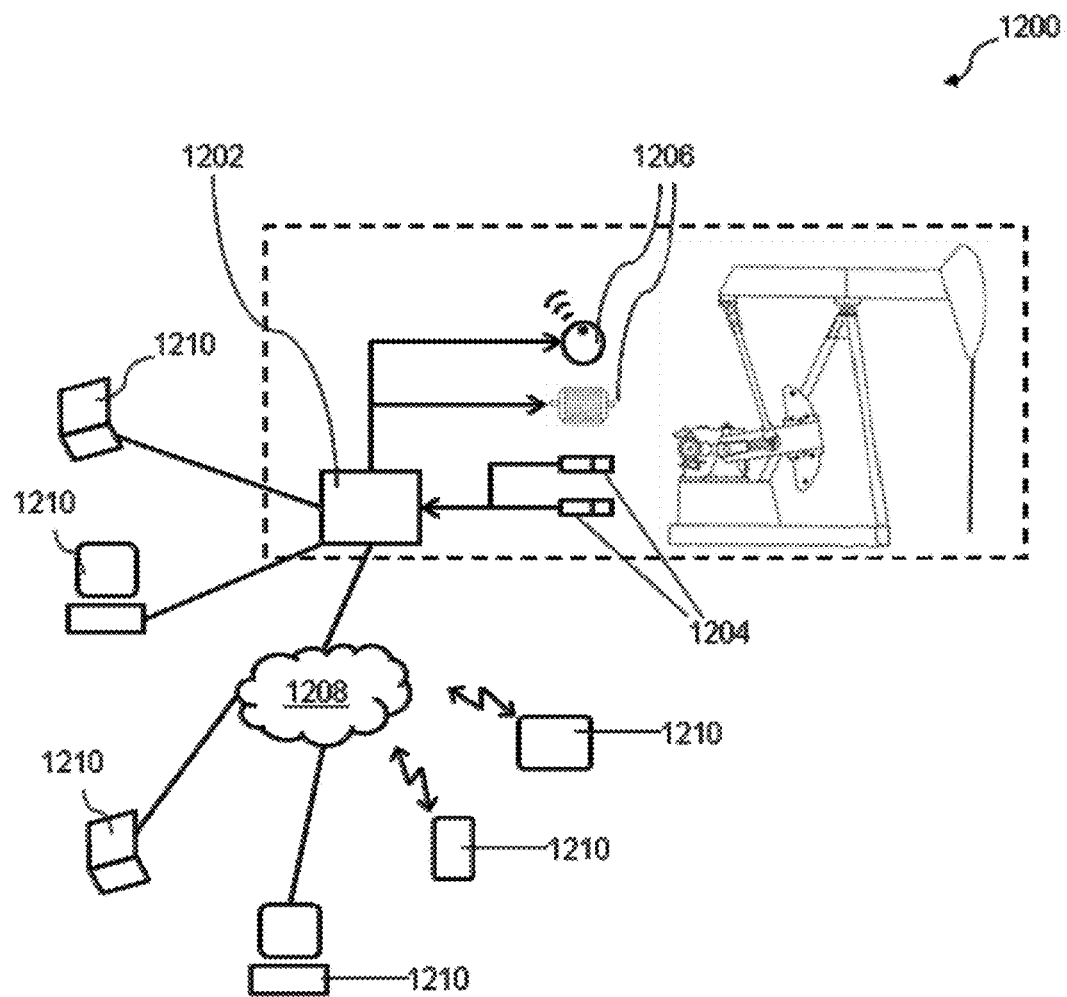
FIG. 12 is a hardware diagram illustrating an embodiment having several components for establishing real time monitoring, network communications and process control whether they be local, remote or a combination thereof.

With reference to FIG. 12, an embodiment of a pumpjack controller is shown. FIG. 12 illustrates the hardware structure of the system 1200 disclosed herein, according to one embodiment. As shown, the system 1200 comprises a controller 1202 installed on the jobsite of an oil well. The controller 1202 may be implemented in a general purpose computer programmed with appropriate software, firmware, a microcontroller, a microprocessor or a plurality of microprocessors, a digital signal processor or other hardware or combination of hardware and software known to those skilled in the art.

The controller 1202 communicates with a plurality of sensors 1204 installed on various devices such as the pumpjack, tubing string, casing, sucker rod and the like, on the ground or in the wellbore, for collecting data regarding the oil well and devices, e.g., crank speed, rod stress, downhole temperature and pressure, fluid level and the like. Those skilled in the art appreciate that it is dependent on the system design and implementation to determine what sensors are required in the system and what data to be collected.

The controller 1202 also communicates with a plurality of action devices 1206 such as variable speed motors, AC or DC variable speed drive such as an ABE ACS-601 (ABE Industry Oy, Helsinki, Finland) or Allen-Bradley 1336 Impact drive (Rockwell Automation, Milwaukee, Wis., USA), dynamic brake, alarm, and the like, for controlling the operation of devices of the oil well, in accordance with predefined rules, e.g., a crank speed profile for controlling crank speed, and/or in response to data collected from sensors 1204.

The system 1200 further comprises one or more computing devices 1210. As those skilled in the art appreciate, each computing device 1210 may comprise a processor, a storage such as Read-Only Memory (ROM), volatile and/or non-volatile Random Access Memory (RAM), solid state drive, hard drive, or the like, a network module, and other components, all connected to the processor via one or more signal buses. Each computing device 1210 executes an operating system, e.g., a real-time operating system, Unix®, Linux®, Microsoft® Window NT, Microsoft® Windows 2000 Server, Microsoft® Windows Server 2012 or the like. Generally, an operating system is a set of computer readable code executed by the processor for managing various hardware and software components, and for supporting the execution of application programs.

Some computing devices 1210 may be deployed in the jobsite of the oil well and connect to the controller via proper wired or wireless means such as direct cable connection, a local area network (LAN), Ethernet, WiFi®, Bluetooth®, Zigbee®, or the like. Some computing devices 1210 may be deployed remote to the oil well, and are connected to the controller through a wide area network (WAN), the Internet, a telephone network, a cable network or satellite, via proper wired or wireless means. Those skilled in the art appreciate that, depending on the system design and implementation, the one or more computing devices 1210 may be desktop computers, laptops, server computers, tablets, smart phones, or the like. As those skilled in the art appreciate, the software disclosed herein may be deployed on one or more computing device 1210, and the processing load may also be dynamically distributed among at least some of the processors of the controller 1202 and/or computing devices 1210.

Other embodiments comprise: a system for controlling a process comprising: at least one processor; at least one sensor coupled to the at least one processor; and a storage coupled with and readable by the at least one processor and storing a set of instructions which, when executed by the at least one processor, cause the processor to perform actions comprising: receiving, from the at least one sensor, real time process data generated by the process; comparing against a predictive objective function and/or a historical mean and/or a predicted operational envelope and/or a predetermined static function for establishing any deviation from normal operation; applying probabilistic modeling at a status agent for classifying the source and likely cause of the deviation; prioritizing actuation of at least one or more diagnostic agents related to causality of the deviation at a supervisory manager; communicating the results of the diagnostic agents to the supervisory manager; modifying the probabilistic model of the status agent from the results from the one or more diagnostic agents; and applying a probabilistic model at a control agent for evaluating risk and recommending appropriate control action to the process.

In another embodiment, a computer-readable storage device is provided comprising computer-executable instructions for controlling a process, wherein the instructions, when executed, cause a processor to perform actions comprising: receiving, from the at least one sensor, real time process data generated by the process; comparing against a predictive objective function and/or a historical mean and/or a predicted operational envelope and/or a predetermined static function for establishing any deviation from normal operation; applying probabilistic modeling at a status agent for classifying the source and likely cause of the deviation; prioritizing actuation of at least one or more diagnostic agents related to causality of the deviation at a supervisory manager; communicating the results of the diagnostic agents to the supervisory manager; modifying the probabilistic model of the status agent from the results from the one or more diagnostic agents; and applying a probabilistic model at a control agent for evaluating risk and recommending appropriate control action to the process.

Other Applications

The system and methodology described herein, both generally and in the specific context of a pumpjack, are also applicable to a wide variety of other processed including: Steam Methane Reformer, Boiler, Heat Treatment Furnace, Water Treatment, and Compressor Skid/System.

In some additional detail for a couple of other scenarios, the nature of such other processes and the role of the Agents is described as follows.

Model Predictive Controller

Model predictive control techniques typically require the nature of disturbances to be known in advance in order to provide control direction to bring the process back within its normal operating envelope. They also require the parameters of the model to be accurately tuned such that inputs to the model generate accurate and relevant outputs. Such applications require significant upkeep by highly skilled and knowledgeable individuals unless they are highly stable. In a batch process application with a model predictive controller, the roles implemented for the agents is similar roles to that in the oil well pumpjack application except that control action is more limited as it is relegated to the model predictive controller. The roles of the Agents include The Data and Modeling Agent, the Status Agent, AI Manager, various Diagnostic Agents wherein the AI Manager will compares the probabilities of the various Diagnostic Agents and updates the Status Agent of the diagnosis of high certainty or initiated additional tests if the level of uncertainty is too high to differentiate a likely cause. The AI Manager may also initiate the Model Tuning agent based on the output of the diagnostic agents.

The Control Agent assesses opportunity and/or risk based on the probability of one or more diagnosis and recommends a change of model or control action to the model predictive controller based on the opportunity/risk analysis.

Compressor Skid/System

Compressor skids are representative of a typical packaged system that is designed to perform a task of a narrow range, in this case the compression of gases to feed into a process or the compression of gases taken from a process to maintain a vacuum. The later can be found on oil wells where the casing pressure is reduced below atmospheric pressure to increase well inflow.

These applications are typical fluid and thermodynamic process where the pumps, valves and process operation are sized for a specific operation and readily modelled. Equipment failure, process disturbances and operational limits account for much of the variation in the process.

Again the roles are very similar to that of the oil well pumpjack application, with the primary change being the process model, the operational states tracked by the Status Agent and the nature of Diagnostic Agents which are process specific. In this case, monitoring the commanded versus actual pressures, flow and temperature of the process to establish probabilities. Depending on the risk and safety implications, the controller may be utilized to conduct actual tests by making small changes to process setpoints and verifying the disturbances and resulting control actions are indicative of proper operation to further isolate the source of process disturbances.

The process the skid is controlling may also be modelled enabling a broader range of scope for the AIMC.

Other Process Systems

The application into other processes, such as furnaces, or boilers, compressors or a collection of processes which are combined into complex systems such as steam reformers or refineries; do not fundamentally change how basic operation of the AIMC and its agents. As the system is designed to operate under uncertain conditions, the scope of control action may be restricted based on the safety and risk tolerance. Much of this can be handled by the preferred implementation which is to have the AIMC make control recommendations to a standard industrial controller which incorporates the necessary safety interlocks and permissives to ensure safe operation in all circumstances.

The embodiments of the invention for which an exclusive property or privilege is claimed are defined as follows:

1. A method for controlling a process of at least one device, the method comprising:
   receiving real time process data generated from the process;
   processing the real time process data, and comparing the processed data against at least one reference of a process model of the process for establishing any deviation from normal operation;
   classifying, at a status agent, a source of the deviation and a likely cause of the deviation;
   prioritizing actuation of one or more diagnostic agents related to the causality of the deviation at a supervisory manager;
   actuating the one or more diagnostic agents;
   communicating the results of the diagnostic agents to the supervisory manager;
   modifying, under the instruction of the supervisory manager, the process model based on the results of the one or more diagnostic agents, if the source of the deviation is the process model; and
   applying, under the instruction of the supervisory manager, the process model at a control agent for evaluating risk and recommending and initiating at least one control action to control the process of the at least one device.

2. The method of claim 1 wherein the prioritizing actuation of one or more diagnostic agents further comprises:
   pattern matching to perform a probabilistic match to known patterns; and
   classifying which of the one or more diagnostic agents are initially activated.

3. The method of claim 1 wherein the supervisory manager initiates a model tuning agent based on the output of the diagnostic agents.

4. The method of claim 1 further comprising: prior to initiating the at least one control action, optimizing the at least one control action.

5. The method of claim 1 wherein the one or more diagnostic agents are sub-agents of an encompassing diagnostic agent.

6. The method of claim 1 wherein each of the agents can operate individually as separate agents, or as a sub-agent of an encompassing agent.

7. The method of claim 6 wherein the encompassing agent comprises an object-oriented Bayesian Network.

8. A method of controlling a process comprising:
   comparing real time data to at least one reference of a process model of the process, said comparing taking into account operational variance and thereby identifying deviations;
   tracking the process and the specific states thereof;
   monitoring and identifying variations of the process from normal operation, and generating outputs;
   based on said outputs, classifying one or more diagnoses relevant to the deviations;
   prioritizing the classified diagnoses for identifying probable causes for the deviation and the likelihood of each of the probable causes;
   comparing the diagnoses with the process model and updating the process model based on a diagnosis of high certainty if the cause for the deviation is the process model, and if sufficiently uncertain to differentiate a likely cause, initiating additional diagnoses;
   assessing opportunity and/or risk of control action based on the identified probable causes for the deviation and their likelihood; and
   recommending at least one control action to control the process based on said assessment.

9. A system for controlling a process of at least one device in response to data collected from a plurality of sensors, said system comprising:
   a status agent for monitoring the status of the system based on data collected from the sensors;
   at least one diagnostic agent for diagnosing at least a portion of the system and collecting diagnostic data from the sensors to identify deviation from normal operation;
   a control agent for performing control actions to the process; and
   a supervisory manager coupling to the status agent, the at least one diagnostic agent and the control agent for:
      receiving real time process data generated from the process;
      comparing against at least one of a predictive objective function, a historical mean, a predicted operational envelope and a predetermined static function of a process model of the process, for establishing any deviation from normal operation;
      classifying, at the status agent, a source of the deviation and likely cause of the deviation;
      prioritizing actuation of the at least one diagnostic agent related to causality of the deviation;
      modifying the process model based on the results of the at least one diagnostic agent, if the source of the deviation is the process model; and
      applying the process model at a control agent for evaluating risk and recommending appropriate control action to control the process of the at least one device.

10. The system of claim 9 wherein the supervisory manager further couples to the status agent, the at least one diagnostic agent and the control agent for:
    initiating at least one control action to the process.

11. The system of claim 9 wherein each of the agents can operate individually as a separate agent, or as a sub-agent of an encompassing agent.

12. The system of claim 11 wherein the encompassing agent comprises an object-oriented Bayesian Network or an undirected probabilistic network.

13. The system of claim 9 wherein the at least one device comprises at least one pumpjack.

14. The system of claim 9 wherein the at least one device comprises at least one of steam methane reformer, boiler, heat treatment furnace, water treatment equipment, and compressor skid.

15. The system of claim 9 wherein the system is distributed in a plurality of jobsites for controlling the devices thereon.

16. The system of claim 9 wherein said classifying a source and likely cause of the deviation comprises:
   applying probabilistic modeling at the status agent for classifying a source and likely cause of the deviation.

17. The method of claim 1 further comprising, after modifying the process model:
   re-processing the real time process data, and comparing the re-processed data against at least one reference of the modified process model for establishing any deviation from normal operation;
   classifying, at a status agent, a source of the deviation and a likely cause of the deviation;
   prioritizing actuation of one or more additional diagnostic agents related to the causality of the deviation at the supervisory manager;
   actuating the one or more additional diagnostic agents;
   communicating the results of the additional diagnostic agents to the supervisory manager; and
   modifying, under the instruction of the supervisory manager, the process model based on the results of the one or more additional diagnostic agents, if the source of the deviation is the process model.

18. The method of claim 1 further comprising:
   prioritizing actuation of one or more additional diagnostic agents if sufficiently uncertain to differentiate a likely cause of the deviation.

19. The method of claim 1 wherein said classifying a source and likely cause of the deviation comprises:
   applying probabilistic modeling at the status agent for classifying a source and likely cause of the deviation.

20. The method of claim 3 wherein the model tuning agent initiates and prioritizes numerical or iterative methods with the process model to identify and quantify the possible contributions to the deviations.

21. The method of claim 1 wherein the at least one reference of the process model comprises at least one of a predictive objective function and/or a historical mean and/or a predicted operational envelope and/or a predetermined static function.

22. The method of claim 1 wherein at least one agent employs a Probabilistic Graphical Network.

23. The method of claim 1 wherein at least one agent employs a Bayesian Network.

24. The method of claim 8 wherein the at least one reference of the process model of the process comprises at least one of a static model of the process, a statistically generated mean reference, a model-based predictive reference, statistical and/or historical profiles of the process and a simulated profile of the process.

25. The method of claim 8 wherein said monitoring and identifying variations of the process from normal operation comprises:
   monitoring and identifying variations of the process from normal operation using probabilistic modeling.

26. The method of claim 25 wherein said probabilistic modeling comprises at least one Probabilistic Graphical Model based state model.

27. The method of claim 8 further comprising:
   after updating the process model, repeating the monitoring, classifying, prioritizing and comparing steps.

* * * * *